(12) United States Patent
Benedetto

(10) Patent No.: US 10,665,265 B2
(45) Date of Patent: May 26, 2020

(54) EVENT REEL GENERATOR FOR VIDEO CONTENT

(71) Applicant: Sony Interactive Entertainment America LLC, San Mateo, CA (US)

(72) Inventor: Warren Benedetto, Foothill Ranch, CA (US)

(73) Assignee: Sony Interactive Entertainment America LLC, San Mateo, CA (US)

(*) Notice: Subject to any disclaimer, the term of this patent is extended or adjusted under 35 U.S.C. 154(b) by 0 days.

(21) Appl. No.: 15/887,948

(22) Filed: Feb. 2, 2018

(65) Prior Publication Data
US 2019/0244639 A1 Aug. 8, 2019

(51) Int. Cl.
| G11B 27/036 | (2006.01) |
| G11B 27/34 | (2006.01) |
| G11B 27/11 | (2006.01) |
| G11B 27/00 | (2006.01) |
| H04N 9/87 | (2006.01) |
| H04N 21/233 | (2011.01) |
| H04N 21/442 | (2011.01) |
| H04N 21/475 | (2011.01) |
| H04N 21/854 | (2011.01) |
| H04N 21/8549 | (2011.01) |
| H04N 21/8547 | (2011.01) |
| H04N 21/845 | (2011.01) |

(52) U.S. Cl.
CPC .......... *G11B 27/036* (2013.01); *G11B 27/005* (2013.01); *G11B 27/11* (2013.01); *G11B 27/34* (2013.01); *H04N 9/8715* (2013.01); *H04N 21/233* (2013.01); *H04N 21/44218* (2013.01); *H04N 21/4756* (2013.01); *H04N 21/8456* (2013.01); *H04N 21/8547* (2013.01); *H04N 21/8549* (2013.01)

(58) Field of Classification Search
CPC ... G11B 27/10; G11B 27/031; G06F 3/04883; G06F 3/165; H04N 21/8456; H04N 21/8547; H03M 1/1245; A63F 13/216; G06K 9/00315
USPC .................. 386/241; 341/123; 715/716, 723; 463/35
See application file for complete search history.

(56) References Cited

U.S. PATENT DOCUMENTS 5,610,825 A * 3/1997 Johnson .............. H03M 1/1071
  341/122
5,627,765 A * 5/1997 Robotham ........... G11B 27/034
  348/E5.065

(Continued)

*Primary Examiner* — Thai Q Tran
*Assistant Examiner* — Syed Y Hasan
(74) *Attorney, Agent, or Firm* — Penilla IP, APC

(57) ABSTRACT

Methods and systems are provided for generating an event reel based on spectator reaction data, the event reel is temporally synchronized to a music track. A method includes receiving a video file for video content and receiving spectator reaction data related to reactions generated by spectators while viewing the video content. The method includes processing the spectator reaction data to identify video time slices from the video content that correspond to segments of interest of the video content. The method includes processing a music track to identify markers for the music track that correspond to beats of the music track and generating an event reel having a video component defined by a sequence of the video time slices that is temporally synchronized to the markers of the music track.

25 Claims, 15 Drawing Sheets

(56) References Cited

U.S. PATENT DOCUMENTS

| | | | | |
|---|---|---|---|---|
| 8,591,332 B1* | 11/2013 | Bright | ............... | A63F 13/42 |
| | | | | 273/460 |
| 9,620,169 B1* | 4/2017 | Nolan | ............ | G11B 27/031 |
| 2002/0175917 A1* | 11/2002 | Chakravarty | ........ | G11B 27/034 |
| | | | | 345/473 |
| 2014/0229829 A1* | 8/2014 | Mazur | ............ | G11B 27/005 |
| | | | | 715/716 |
| 2018/0077440 A1* | 3/2018 | Wadhera | ............ | H04N 21/8456 |
| 2018/0093185 A1* | 4/2018 | Black | ............... | A63F 13/537 |

* cited by examiner

EVENT REEL GENERATOR FOR VIDEO CONTENT

FIELD OF THE DISCLOSURE

The present disclosure relates generally to event reel generation for long-form video or audio entertainment content, and more particularly to methods and systems for automatically selecting segments of video content for inclusion in the event reel and for automatically mapping and synchronizing the segments to a music track.

RELATED APPLICATION

Application Ser. No. 15/864,675 filed Jan. 8, 2018 entitled "IDENTIFYING PLAYER ENGAGEMENT TO GENERATE CONTEXTUAL GAMEPLAY ASSISTANCE" is incorporated herein by reference.

BACKGROUND

Event reels are a useful of communicating long-form video content to viewers in a condensed fashion. For example, "highlight reels" or "highlights" are often used to convey meaningful segments of long-form video content such as TV shows, movies, user-generated videos, news shows, sporting event broadcasts, and video game sessions or competitions, etc., in a relatively short time. An event reel of a basketball game may, for example, condense a two-hour game into ten minutes by piecing together video segments of two-hour game showing every made basket and every blocked shot. As consumers are increasingly demanding more information and entertainment in less time, event reels provide a mechanism to meet these needs.

In the area of video games, players often desire to have others view their game play either in real time or as a replay. Before the Internet came into being, spectators could watch a video game session being played by a player by being in the same physical location as the video game player. It has become easier to share video game sessions through the internet in more recent times. Video game players can upload their video game sessions to Internet websites or sharing platforms for replay by spectators.

In some instances, uploaders of video game sessions have been known to edit the video game session from a full-length version to an edited-down version. For some consumers, viewers are much more likely to commit themselves to view a 5-minute edited version than an up to 60-minute full-length version. However, current processes of editing video game sessions are long and laborious, requiring specialized software. As a result, most video game players and video game sessions are never edited or shared. Moreover, even the game sessions that do become edited and shared have many limitations. For example, editors of video game session are not always attuned to what the spectators desire to see in a video game session replay. Additionally, current edited video game replays do not always mesh well with an accompanying music track for the replay. Similar difficulties and deficiencies are also present in the creation of event reels for the other long-forms of video content.

It is in this context that embodiments arise.

SUMMARY

Embodiments of the present disclosure relate to methods and systems for generating an event reel using video segments that are selected based on spectator reaction data, where the event reel is synchronized to musical patterns of a music track. The video segments may be sourced from almost any type of long-form video content that viewers are able to provide reaction feedback to. For purpose of illustration and example, long-form video content may refer to TV-shows, movies, shorts, advertisements, user-generated video content, news shows, podcasts, awards shows, sporting events, video game sessions or competition footage, video logs (vlogs), etc. Other forms of video content that associated with spectator reaction data are also used with the methods and systems described here. However, because spectator reaction platforms are being used more widely in areas of video game streaming at present than other forms of video content, some of the following embodiments will be described in reference to video game session content. It will be understood, though, that the present disclosure is not limited to any particular type of video content input, and that the system and method embodiments may operate other video content inputs without limitation to their genre, category, length, form, or purpose.

Spectator reaction data includes input commands (e.g., "react" or "reactions") that are performed by spectators while viewing video content via an application that is executed on a computer, phone, tablet, gaming console, laptop, TV, etc. The video content may include TV-shows, movies, video-logs (vlogs), live gaming streams, sporting event broadcasts, user generated content, etc. In the context of video games, for example, spectators are enabled to "live react" to video game sessions by inputting reactions such as emojis, emoticons, likes, thumbs-up, thumbs-down, thumbs-sideways, animojis, symbols, etc., as the spectator views the game session in real-time. As a result, reactions will tend to correlate in time to the state of events of the game session, although there may be some delay between an in-game event and an associated reaction to the event due to the time it takes to interpret the event and input the reaction. Spectator reaction data that is from live reacting may be for a live game or a replay of a game. That is, for example, a spectator may still live react to a video game session even though the video game session is itself a replay or a rebroadcast.

It is noted that reactions or live reactions or spectator feedback may refer to various forms of capturing or interpreting spectator or viewer reaction, emotion, sentiment, expression, moods, etc. (herein referred collectively as spectator feedback or spectator reaction). As noted above, one way spectator reaction data may be obtained is through the manual or physical input of a reaction via a user interface such as a controller, a computing device, a touch screen, a mouse, or some other user input device.

In other embodiments, spectator reaction data may be captured automatically and without overt user input. For example, a spectator's emotional state may be captured by analyzing images captured by a camera of the spectator. In some embodiments, image analysis processes for facial expression detection may be employed to automatically identify spectator reaction and emotions. Further embodiments may analyze audio recordings captured via microphone to help automatically detect a spectator's emotional state. In these and other embodiments, other devices such as biometric input devices such as heart rate or heartbeat pattern monitoring devices, moisture sensors, temperature sensors, brainwave sensors, or other physiological monitoring devices. Output from one or a combination of these devices may be used to map a spectator's emotional state to one or more reaction states for the spectator reaction data. Some of the embodiments for automatically detecting reactions, responses, or emotional states are further described in application Ser. No. 15/864,675 filed Jan. 8, 2018, entitled "IDENTIFYING PLAYER ENGAGEMENT TO GENERATE CONTEXTUAL GAME PLAY ASSISTANCE", which is incorporated herein by reference.

In some embodiments, spectator reaction data that is derived from express, overt, or physical input of a device such as through a touchscreen device, a controller, a mouse, a keyboard, etc., may be referred to as active spectator reaction data. On the other hand, spectator reaction data that is derived through automatic detection of spectator emotional states such as through image capture and facial expression analysis, biometric data analysis, audio recording analysis, etc., may be referred to as passive spectator reaction data. It is contemplated that certain embodiments may utilize both active spectator reaction data and passive spectator reaction data for detecting a spectator's reactional or emotional state with greater accuracy. Additionally, certain embodiments are envisioned to use the combination of active and passive spectator reaction data to train artificial intelligence (AI) units to better recognize emotional reactions.

For example, if an AI unit is provided with both an active spectator reaction and a passive spectator reaction, the AI unit could establish connections or matches between the active spectator feedback (e.g., inputting a "happy" emoji) and the passive spectator reaction (e.g., the image capture and sound capture data related to what the persons looks and sounds like when they are happy.) The AI unit may also learn from active and passive spectator reaction data that do not match, e.g., false-positives or false-negatives. For example, if a spectator appears to be scowling but inputs an emoji that indicates amusement, the AI unit may learn that the image data corresponding to the scowl does not necessarily map to or indicate anger. As a result, the active and passive forms of spectator reaction detection may be used to train the AI unit to more accurately detect spectator reaction even when the spectator does not provide an active spectator input. It is therefore envisioned that spectator reaction data may be made more accurate for the determination of segments of interests for the event reel.

Embodiments discussed herein leverage spectator reaction data (e.g., live reaction data) to automatically determine segments that are most likely to be of interest to a viewing public for creating an event reel of a video game session. In addition to having the segments of interest for the event reel, embodiments contemplated here are also able to synchronize and match those segments of interest to a soundtrack such as a music track for the event reel.

In one embodiment, a method includes operations for receiving a video file of a video content and for receiving spectator reaction data related to reactions generated by spectators while viewing the video content, wherein the spectator reaction data is indicative of segments of interest. The method includes processing the spectator reaction data for identifying video time slices from the video content that correspond to the segments of interest of the video content, wherein each of the video time slices includes a plurality of video frames from the video content. The method further includes and operation for processing a music track to identify markers for the music track that correspond to beats associated with the music track. The method also provides an operation for generating an event reel having a video component defined by a sequence of the video time slices and an audio component defined by the music track, wherein the generating the event reel includes synchronizing the video time slices to the markers for the music track, wherein the synchronizing causes scene changes between sequential video time slices to correspond in time with at least a portion of the beats associated with the music track.

In another embodiment, a server system is provided including one or more processors and a memory disposed in communication with the one or more processors. The memory includes processor-executable instructions to receive a video file of a video content and instructions to receive spectator reaction data related to reactions generated by spectators while viewing the video content, the spectator reaction data is indicative of segments of interest. The memory of the system includes instructions for processing the spectator reaction data for identifying video time slices from the video content that correspond to the segments of interest of the video content, each of the video time slices includes a plurality of video frames from the video content. The memory of this embodiment includes instructions for processing a music track to identify markers for the music track that correspond to beats associated with the music track. The memory for this system embodiment also includes instructions for generating an event reel having a video component that is defined by a sequence of video time slices and an audio component that is defined by the music track. According to this embodiment, the generating the event reel includes synchronizing the video time slices to the markers for the music track wherein the synchronizing causes changes of scenes between video time slices to correspond in time with at least a portion of the beats associated with the music track.

In another embodiment, a non-transitory computer-readable storage medium storing a computer program executable by a processor-based system includes program instructions for receiving a video file of a video content and program instructions for receiving spectator reaction data related to reactions generated by spectators while viewing the video content. The spectator reaction data is indicative of segments of interest for this embodiment. The non-transitory computer-readable storage medium storing the computer program executable by a processor-based system further includes program instructions for processing the spectator reaction data for identifying video time slices from the video content that correspond to the segments of interest of the video content, wherein each of the video time slices includes a plurality of video frames from the video content. The embodiment also includes program instructions for processing a music track to identify markers for the music track that correspond to musical signatures associated with the music track. The non-transitory computer-readable storage medium further includes program instructions for generating an event reel having a video component defined by a sequence of the video time slices and an audio component defined by the music track, the generating the event reel includes synchronizing the video time slices to the markers for the music track, wherein the synchronizing causes scene changes between sequential video time to correspond in time with at least a portion of the musical signatures.

It is noted that video time slices refer to the segments of a video content that may or may not be contiguous within the full-length video content. In many embodiments, video time slices will not necessarily be contiguous to one another within the full-length video content (although sometimes they may be depending on the spectator reaction data). Thus, a sequence of video time slices may refer to a set of segments of video excised from various locations a full-length video content that are not necessarily contiguous within the full-length video content.

For example, two sequential video time slices for an event reel may be separated in the full-length video content by some amount of time or a plurality of video frames (e.g., by 10 minutes). For the event reel, however, the sequential video time slices, although separated in the full-length video content, are brought together segments that are played sequentially, e.g., one after the other. In some embodiments, the bringing together of segments involves joining video time slices together, which is a video editing process that is well known in the art. As used herein, joining video time slices together involves a video editing process that causes a second video time slice to be played following a first video time slice.

In other embodiments, sequential video time slices may refer to segments that are contiguous within the full-length video content, depending upon the spectator reaction data. For example, if indicated by the spectator reaction data, two discrete video time slices may be cut from respective segments that are contiguous within the full-length video contents. Thus, it is contemplated that a sequence of video time slices may refer to a set of video clips that joined or to be joined together where the clips may be from contiguous segments in the full-length video content or from non-contiguous segments in the full-length video content. These properties for the sequence of video time slices are described in further detail below.

In some embodiments, the event reel may be referred to as a democratized event reel because the video time slices that are selected for inclusion into the event reel is determined by spectator reaction data as opposed to an editor's discretion.

It is noted that in some embodiments, the original audio that accompanies the gaming session replay may be retained for the event reel. For example, if a gaming session replay is of a role-playing game, the game audio for the gaming session may include various sounds generated by the game and in response to the gamer's actions. These sounds may be saved as an audio file that is mixed in with the music track for the event reel. In some embodiments, the game audio may be mixed with a lower volume intensity than that of the music track. In other embodiments, the game audio may be mixed with higher volume than the audio track. In still other embodiments, the game audio may be selectively mixed such that only audio segments of significance are made enough sound intensity to be heard, whereas audio segments of less significance are cut out. In further embodiments, the game audio may be stripped entirely for the creation of the event reel.

It is noted here that an event reel is video. Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which.

DETAILED DESCRIPTION

Figure 1:
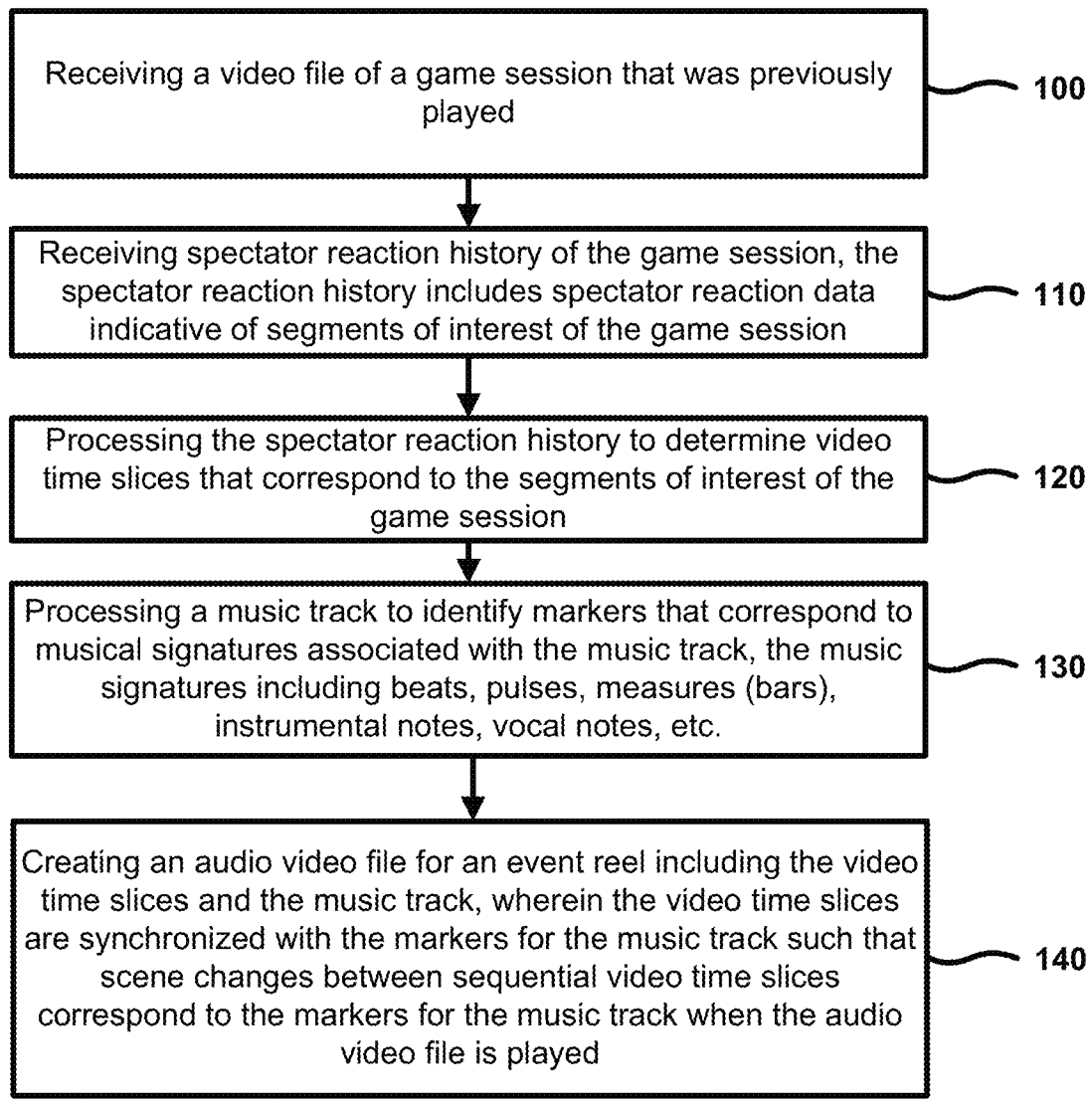
FIG. 1 shows an overall flow of a method for creating a democratized event reel that is synchronized to a music track, according to one embodiment.

The following embodiments describe methods, computer programs, and apparatuses for generating event reels for long-form video content based on spectator reaction data that are automatically mapped and synchronized to music tracks. It will be obvious, however, to one skilled in the art, that the present disclosure may be practiced without some or all of these specific details. In other instances, well known process operations have not been described in detail in order to not unnecessarily obscure the present disclosure.

Event reels are video content. For example, event reels such as highlight reels are useful in many spectator activities for their ability to convey the more impactful moments of an event in a relatively short period of time. Event reels may be made for sporting events, movies (e.g., movie trailers), speeches, concerts, award ceremonies (e.g., Grammy's), user-generated video content, podcasts, video logs (vlogs), video gaming sessions, e-sports broadcasts, among other types of events.

For video games, event reels are especially popular and useful among consumers because they allow consumers to improve their own play by watching others' play. Highlights of high profile video gamers and video game competitions may attract millions of views online in a short period. Even the average player may desire to create event reels of their game sessions to share with friends and followers, which creates useful and monetizable content.

Video game players often create event reels (e.g., highlight reels) of their games to showcase their gameplay to the gaming community. Event reels such as highlight reels are becoming an increasingly popular form of experiencing and engaging with a video game outside of playing the game itself. As a result, event reels are becoming a driver of video game engagement among players and video game popularization among the public.

Current event reels are typically manually created by the player, which is a long and laborious process requiring specialized software. The content of current event reels is generally selected unilaterally by the creator of the event reel, and does not always reflect segments of interest to the viewing public. There are live game streaming platforms that allow spectators to react to the live game action using emojis, emoticons, likes, and other symbols. As a result, there is an opportunity to leverage data generated by a reacting spectating public to determine which segments of a video game session are of interest to the viewing public.

In addition to identifying the segments (e.g., clips, highlights, sections, time slices) for inclusion, there is also a process of synchronizing the identified segments to the musicality of a chosen soundtrack. The event reel is made more powerful and memorable by having a soundtrack, similar to how movie trailers are enhanced by accompanying music. However, if the video component is not temporally synchronized to the soundtrack, the beneficial effect of the soundtrack for the event reel is diminished.

Embodiments contemplated here are used to generate democratized event reels of long-form video content such as TV-shows, movies, shorts, user-generated video content, podcasts, sporting event broadcasting, awards shows, news shows, video gaming streams, etc. The embodiments enable automatic selection of various video segments or slices from the long-form video content based on spectator reaction data. Various embodiments also enable automatic temporal synchronization of the selected segments to a music track. In addition to temporal synchronicity of video segments to beats of music track, certain embodiments are also enabled to match emotional properties of game session content to that of portions of the music track.

Although many of the embodiments described herein refer to gaming sessions of video games for illustrative purposes, it will be understood that the methods and system described here are not limited to game sessions or video games. Video game content is merely an exemplary input or substrate for the method and system embodiments described throughout the specification. Many of the principles that are demonstrated with reference to video game sessions are also used to generate event reels from other types of video content input, as long as the video content input is associated with spectator feedback data such as reaction data. Since many forms of video content are associable or amenable to spectator feedback and spectator reaction data, such as TV-shows, movies, user-generated content, podcasts, sporting events, awards shows, news shows, video-logs (vlogs) and the like, embodiments discussed herein operate on each of the aforementioned types of content inputs generate event reels. However, because spectator feedback and reaction data for video game streaming sessions are generally more abundant and accessible at present, the following embodiments will be described with respect to video game sessions to better demonstrate the features of the embodiments. Again, however, it will be appreciated that the embodiments are input-independent with respect to the precise genre, category, format, or purpose of the video content input.

It is noted that in some embodiments, the original audio that accompanies the gaming session replay may be retained for the event reel. For example, if a gaming session replay is of a role-playing game, the game audio for the gaming session may include various sounds generated by the game and in response to the gamer's actions. These sounds may be saved as an audio file that is mixed in with the music track for the event reel. In some embodiments, the game audio may be mixed with a lower volume intensity than that of the music track. In other embodiments, the game audio may be mixed with higher volume than the audio track. In still other embodiments, the game audio may be selectively mixed such that only audio segments of significance are made enough sound intensity to be heard, whereas audio segments of less significance are cut out. In further embodiments, the game audio may be stripped entirely for the creation of the event reel.

FIG. 1 shows an overall flow of a method for creating a democratized event reel that is synchronized to a music track, according to one embodiment. The method includes operation 100 for receiving a video file of a game session that was previously played. Many video games record a copy of a player's game session while the player is interacting with the game. The copy may be stored to a remote gaming server for playback at a later time for the player and others. In other embodiments, the game session may be recorded locally on a local device such as a game console, a personal computer, a mobile device, a tablet device, a robot utility and interface device, and the like. The video file of the game session may be saved in a number of formats, some custom to the video game or publisher or game platform, and others in more common standards. Additionally, an audio track associated with the game session may also be included by the video file of the game session.

In operation 110 of the method of FIG. 1, spectator reaction data collected during the game session is received, the spectator reaction data is indicative of segments of interest of the video game session. For example, when the player plays the video game during the game session, he or she may live broadcast the session to the public. There are many platforms that enable live broadcasting of video game sessions, and many of them enable the audience to "react" instantly to the game play. Reactions are becoming a popular way for recipients of information to instantly and concisely respond to the information. Live game broadcasts are beginning to adopt this mode of communication between players and their audience and vice versa. Reactions may include emojis, emoticons, thumbs-up, thumbs-down, thumbs-sideways, icons, symbols, avatars, etc.

In addition to recording a copy of the game session, video game service provider or the live broadcast service provider may also record a reaction history for the game session. The reaction history for a given game session may include entries for each of the reactions, such as the sender of the reaction, the timestamp for the reaction, whether the sender is a friend of the player or not, etc. As a result, the reaction history may describe the collective reaction of the audience over the course of the game session.

The spectator reaction history may include spectator reaction data that is manually inputted by the spectators (e.g., via pressing a button that produces a reaction), or automatically detected of the spectators (e.g., via image capture and facial expression analysis), or a combination of both. It is also noted here that spectator reaction data or spectator reaction history may refer to either active or passive spectator reaction data, or a combination of both.

Operation 120 serves to process the spectator reaction history to determine or identify video time slices that correspond to segments of interest of the video game session. A video time slice as referred to herein as including a temporal subset of video frames of the set of video frames that define the video game session. The video time slices may also be referred to as clips, snippets, shots, and may also refer to audio portions that are associated with the video frames of the video time slice. As will be described in more detail below, video time slices function as the set of video frames that are targeted for inclusion into the event reel. A video time slice may also be referred to using time coordinates of the original game session video that indicate when a video time slice is to begin and when it is to end.

In one embodiment, operation 120 may include processes that sum the total number of reactions occurring during various time intervals of the video game session. As an example, a time interval may be between about 1 second to about 30 seconds or more. A shorter time interval may correlate with greater temporal resolution for determining collective reaction states, while longer time intervals may correlate with a lessened temporal resolution. For example, it is contemplated that video game session having more spectators and more reactions per unit time may be analyzed using smaller time intervals than video game session having less spectators and a less reactions per unit time.

The number of total reactions during a given interval may serve as a proxy for spectator interest for the action of the game session during the given interval. In some embodiments, more reactions indicate more interest. Thus, operation 120 uses the spectator reaction history to identify video time slices of the video game session that are likely to be of interest to viewers of the event reel. Other embodiments of time slice identification will be discussed in more detail below.

As noted above, automatic detection of spectator reaction in conjunction with artificial intelligence (AI) may be employed to obtain greater accuracy and confidence with respect to the spectator reaction data. That is, for example, passive spectator reaction data may be utilized in operation 120 to further refine the spectator reaction history to determine video time slices that correspond to segments of interest of the game session. In certain embodiments, there may be periods of the video game session in which active spectator reaction inputs are few, but for which notable, non-insignificant spectator reaction exists.

It is contemplated, then, that passive spectator reaction data may be used to inform and optimize the spectator reaction history. As a result, a video time slice that may not otherwise qualify as a segment of interest based on active spectator feedback may be determined to be a segment of interest based on passive spectator feedback. Thus, both active spectator reaction data (e.g., inputting an emoji) and passive spectator reaction data (e.g., image capture and facial expression recognition) are contemplated to be used in combination for some embodiments. In certain embodiments, active spectator reaction data may be used without using passive spectator reaction data, whereas in certain other embodiments, passive spectator reaction data may be used without using active spectator reaction data. Also, an AI unit may be employed along with these embodiments to enhance the accuracy of the passive spectator feedback by comparing it with the active spectator feedback, according to some embodiments.

In operation 130, the method shown in FIG. 1 proceeds to process a music track to identify markers that correspond to musical signatures associated with music track. In certain embodiments, a waveform associated with the music track is processed to identify the markers that correspond to musical signatures. A waveform is format of representing the vibrational energy output caused by pressure waves (e.g., sounds) of a song. The amplitude of the waveform defines the sound pressure output as a function of time. Musical signatures appear in the waveform as spikes or peaks, which are then detectable by operation 130.

Musical signatures are a type of musical property of a track that include beats, pulses, measures, bars, and notes. The markers that are identified by operation 130 include data that refer to the time points at which the musical signatures occur in the course of playing the musical track. For example, a generic pop song with a tempo of 120 beats per minutes (bpm) and lasting for 3 minutes will have about 360 beats. Thus, the method shown in FIG. 1 may identify a marker for each of the 360 beats of the song. A given marker may therefore tag or refer to a given beat using temporal data. For example, a marker may identify a beat occurring at 1 minute, 10 seconds, and 100 milliseconds into the song with a time coordinate of "01:10.100," according to one embodiment.

In some embodiments, operation 130 may be configured to identify markers of the music track that are in addition to those that refer to beats. For example, operation 130 may create markers for measures or bars of a song. A measure is a group of beats that functions as a repeated unit throughout a song. In a common time signature of 4/4, a measure is a set of 4 beats, the first of which is called a downbeat. The downbeat of a given measure of 4 beats partitions the measure from the preceding measure by being stressed, accented, or emphasized in sound. The measure is likewise partitioned from the subsequent measure by a downbeat of the subsequent measure. In some embodiments, operation 130 is configured to identify the measures of the music track by creating markers for downbeats within a song. In other embodiments, other musical signatures such as upbeats, backbeats, half-beats, etc. may also be identified by operation 130.

It is contemplated that the makers for musical signatures identified in operation 130 are to be used to produce an event reel where scenes are synchronized to the music track. Many of the ways in which markers are envisioned to be used to accomplish synchronization will be discussed in more detail below. Briefly, however, one of the goals of the embodiments described here is to enable creation of overall matching between video and audio, which may include ensuring a level of temporal synchronicity, "production sense", and emotional congruence of the two forms of media.

In some embodiments, temporal synchronization includes synchronizing the features of a video component with features of an audio component such that the features occur together during playback of the audio video media file. It is contemplated that one way to accomplish time synchronization between the video scenes be "on beat" with the audio. One way to creating an event reel that is on beat with a music track is to have scene changes between video clips occur on time with a beat of the music track. Another way of accomplishing temporal synchronization between audio and video is to have scene changes between video clips (e.g., video time slices) occur on the downbeat of a measure, since that is the predominant beat of each measure. In still other embodiments, temporal synchronization is contemplated to be achieved by having scene changes occur in time with different sections or subsections of a song. Markers that are identified by operation 130 are to be used for the temporal synchronization of scene changes with beats, measures, or sections of the music track.

Operation 140 of the method of FIG. 1 serves to create a synchronized audio video file for the event reel that includes the video time slices and the music track, wherein the video time slices are synchronized with the markers for the music track such that scene changes between sequential video time slices correspond to the markers for the music track when the event reel is played. A scene change or a change of scene as used herein refers to a configuration of showing a first video. As mentioned above, it is contemplated that scene changes or cuts between sequential video time slices are to be on beat with the music track to enhance temporal synchronicity between the video and audio of the event reel.

For example, if a given event reel includes 50 video time slices of a video game session, the resulting event reel will also include 49 transitions or scene changes between the 50 video time slices. It is contemplated that operation 140 will find a marker that correlates to a beat for each of the 49 transitions for determining the timing that each of the 49 transitions should occur during creation of the event reel. As a result, the 49 transitions are timed up with the beats of the song. As such, scene changes between the 50 video time slices are caused by the method to occur during meaningful times of a song during playback of the event reel as opposed to occurring haphazardly and without discretion to the properties of the music track. As a result, the method of FIG. 1 is enabled to create an event reel that is not only democratized in terms video segment selection due to spectator reaction processing, but that also has higher production value and impact value due to temporal synchronization.

In certain embodiments, the video component for a video game session is edited down from its original duration to the duration of the music track. As a result, in these embodiments, the music track is not necessarily edited down and will sound the way it would otherwise sound. That is, for example, if the video game session is 30 minutes long and the music track is 3 minutes long, the video game session will be edited down from 30 minutes to 3 minutes, whereas the music track will not be edited down in time. In some embodiments, the music track may still be edited for sound, but not necessarily for time.

Figure 2:
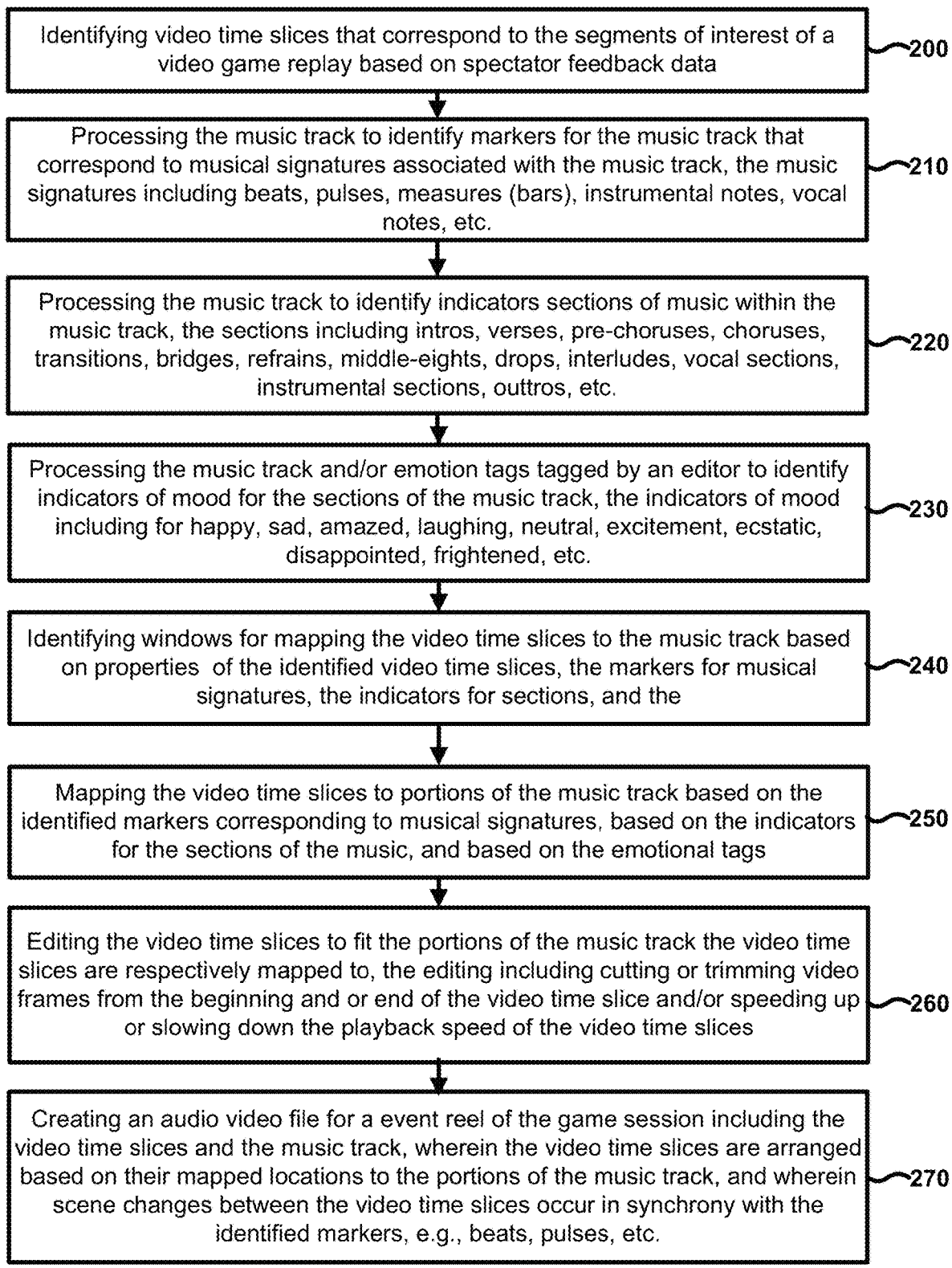
FIG. 2 shows an overall flow of a method for creating a democratized event reel that is synchronized to a music track, according to another embodiment.

FIG. 2 shows an overall flow of a method for creating a democratized event reel that is matched to a music track. As noted above, matching describes a concept of ensuring emotional congruence, production complementarity, and temporal synchronicity between a video component and an audio component of a multimedia segment. As used herein, congruence or emotional congruence between audio and video may refer to agreement between emotional values or mood values of the video scene with that of a music track. Further, as referred to herein, complementarity or production complementarity refers to a level of coherence between the content of a given video clip and the purpose or motif of a given section of the music track. That is, complementarity refers to whether audio and video when matched, when matched, makes production sense. Although described here separately, the processes of ensuring temporal synchronicity, congruence, and complementarity are not mutually exclusive in execution or in concept in various embodiments. They are referred to separately for purposes of explanation and clarity.

Operation 200 of FIG. 1 serves to identify the video time slices that correspond to segments of interest for a video game session based on spectator reaction data. Various methods for identifying video time slices corresponding to segments of interest based on spectator reaction data are contemplated and will be described in more detail below. In some embodiments, operation 200 may identify anywhere between about 20 and about 50 video time slices, or between about 10 and about 100 video time slices, or between about 2 and about 500 video time slices for a game session. The number of video time slices will range depending on the duration of the game session, the type of game of the game session, the spectator reaction data, whether the game session is in single player mode or multiplayer mode, as well as the targeted length of the event reel (e.g., the length of a chosen song, the number of songs targeted for an event reel with more than one accompanying song). It is contemplated that not all of the video time slices are used in the event reel and thus may be filtered down depending on the spectator reaction data and targeted duration of the event reel, among other factors. In any case, operation 200 serves to make available the segments of the game session that will likely be of interest.

Operation 210 serves to process a music track to identify markers for the music track that correspond to musical signatures associated with the music track. As noted above, musical signatures are a type of musical property of a song that form the basic units that make up a song. Musical signatures include beats, pulses, measures, bars, instrumental notes, vocal notes, among others. Markers are created for these musical signatures by analyzing a waveform representation of the music track. The markers may include temporal data that identifies the timing of the musical signatures. However, because musical signatures such as beats take time to be output, for example, taking anywhere between about 50 milliseconds to about 1000 milliseconds for a single beat to be start and finish, it is contemplated that markers may have more than one temporal identifier associate with it. At least, the marker should refer to the time point when the beat starts, and in some embodiments, may also refer to the time points in which the beat apexes in sound intensity as well as time points in which the beat ends. For most embodiments described here, the identified markers should refer to the beginning or near beginning of the beat or other musical signature.

Operation 220 of FIG. 2 serves to further process the music track to identify sections and subsections of the music track that function as higher-level unit in the structure of the rack than individual measures or beats. Sections and subsections of a music track are usually comprised of one or more measures and serve an intended purpose, or mechanic, or motif for the music track. Sections and subsections (or simply sections) may include portions of music such as intros, verses, pre-choruses, choruses, transitions, bridges, refrains, middle-eights, interludes, recapitulations, vocal sections, instrumental sections, outros, codas, builds, drops, improvisations, among others.

It is contemplated that operation 220 is configured to identify these sections for complementation of the video and audio of the event reel. One way operation 220 is envisioned to detect distinct sections is through analysis of patterns in the waveform that indicate when a particular section starts and stops. Furthermore, one way of complementing video time slices to sections in a music track is to create a scene transition at the onset of the various sections in the music track. For example, in one embodiment, a song with 10 sections may have a scene change between video time slices at the first note or beat of each of the 10 sections. Some sections will have more than 1 video time slices associated with it if there are more than 10 video time slices. In many embodiments, sections will typically be associated with several video time slices, since in these embodiments the number of video time slices will be greater than the number of sections of the track, although this is not necessarily always the case.

Certain sections or subsections of a music track may have a coherence or unity associated with it that would weigh in favor of a continuous video clip for the section without a scene change. In some embodiments and for some songs, these sections may include hooks, transitions, the first measure after a drop, etc. That is, it may not make production sense to have scene changes during certain periods within the music because of the focus of the music. In these embodiments, audio-video complementarity may be better served by identifying these sections as protected regions where a certain weighting is applied to have no scene changes during the section. Nevertheless, a scene change between video time slices may occur at the onset of the protected region, just not during the section, if possible. Other embodiments may not use protected regions during the matching processes, however, and some songs may not have sections that should be protected.

The method of FIG. 1 recognizes that production complementarity is increased when the content of a particular video time slice matches that intended purpose or function of the sections. For example, it does not make production sense to map a major, climactic, or "turning point" segment of the game session to the intro, the exposition, the interlude, or the coda or outro of a song. Likewise, it does not benefit production complementarity to map a tame, minor, or uneventful segment of the game session to the choruses, hooks, or measures following a "drop" in the track. Thus, in some embodiments, one embodiment for attaining production complementarity includes further identifying various sections of a track with an intensity indicator (e.g., low, medium, high) as a proxy for describing the intended purpose or motif of the various sections. The intensity indicator for a section may then be used to map one or more video time slices with similar intensity levels to the section for the creation of the event reel. As a result, a level of production complementarity may be achieved that enhances the production value of the event reel.

In operation 230, the method shown in FIG. 2 further processes the music track and/or tags received by a human editor of the music track to create mood tags for various portions of the song. Music conjures emotions, feelings, and moods in humans, ranging from happiness, elation, excitement, melancholy, anger, determination, unease, anxiousness, whimsicality, among many others. Emotional tags or mood tags as referred to herein may include the computational or digital correlate of such mental states that attempt to approximate, predict, or describe the corresponding mental state.

It is contemplated that operation 230 is configured to process the music track and metadata associated with the music track to identify mood tags for portions of the song. In some embodiments, the mood tags may be identified by analyzing the lyrics of the music track. Lyrics may be obtained via a third-party website or through voice analysis of the music track. In other embodiments, mood tags may be manually tagged via an interface by a human editor who interprets the song (see FIG. 9). In still other embodiments, metadata including timestamped comments for the music track may be retrieved and processed to identify the moods tags. Certain music streaming services such as Soundcloud and YouTube allow users to live comment on a streaming song while the user is listening to the song in real time. As a result, comments that refer to points within the song may be leveraged to determine the emotional character of portions of a song using word mapping and analysis. Thus, an emotion tag may be created for portions of a music track by way of operation 230.

As noted above, emotional congruity between audio and video involves mapping video time slices with certain emotional properties as indicated by the spectator reaction data with portions within the music track having similar emotional properties as indicated by the emotion tags. The method contemplated here is able achieve a level of emotional congruence that enhances the development and narrative of the resulting event reel.

Operation 240 of FIG. 2 serves to identify windows for mapping the video time slices to the music track based on properties of the identified video time slices, the markers for musical signatures (e.g., beats), the indicators for the sections (e.g., intro), and the emotion tags for portions of the track (e.g., sad). It is contemplated that windows may be identified to enhance effectiveness of the subsequent mapping operation of operation 250 by screening the multitude of possible combinations and permutations of ways video time slices may be mapped to the track. In some embodiments, the identification of candidate windows for mapping video time slices is accountable to both the musical properties of the music track (e.g., beats, measures, sections, emotions) as well as properties of the identified video time slices such as the number and duration of the video time slices.

For example, if 60 video time slices are being targeted to a 3-minute track, operation 240 is configured to create windows that are on average 3 seconds long. If, on the other hand, only 20 video time slices were being targeted to a 5-minute track, then operation 240 would find windows averaging 15 seconds in duration. In both instances, operation 240 would remain accountable to the markers for musical signatures, the indicators for sections and subsections, and emotion tags for portions of the track.

Operation 250 serves to map the video time slices to windows within the music tracks based on the identified markers, the intensity indicators, and the emotion tags. Windows, as referred to here, are time portions associated with the music track that the video time slices are made to fit to. Operation 240 is configured to arrange the video time slices identified by operation 200 in an order such that constraints of temporal synchronicity (e.g., scene changes are on beat), production complementarity (e.g., video time slice intensity agrees with intensity of section of the track), and emotional congruence (e.g., a sad scene is mapped to a melancholic portion of the track) are satisfied.

Figure 8:
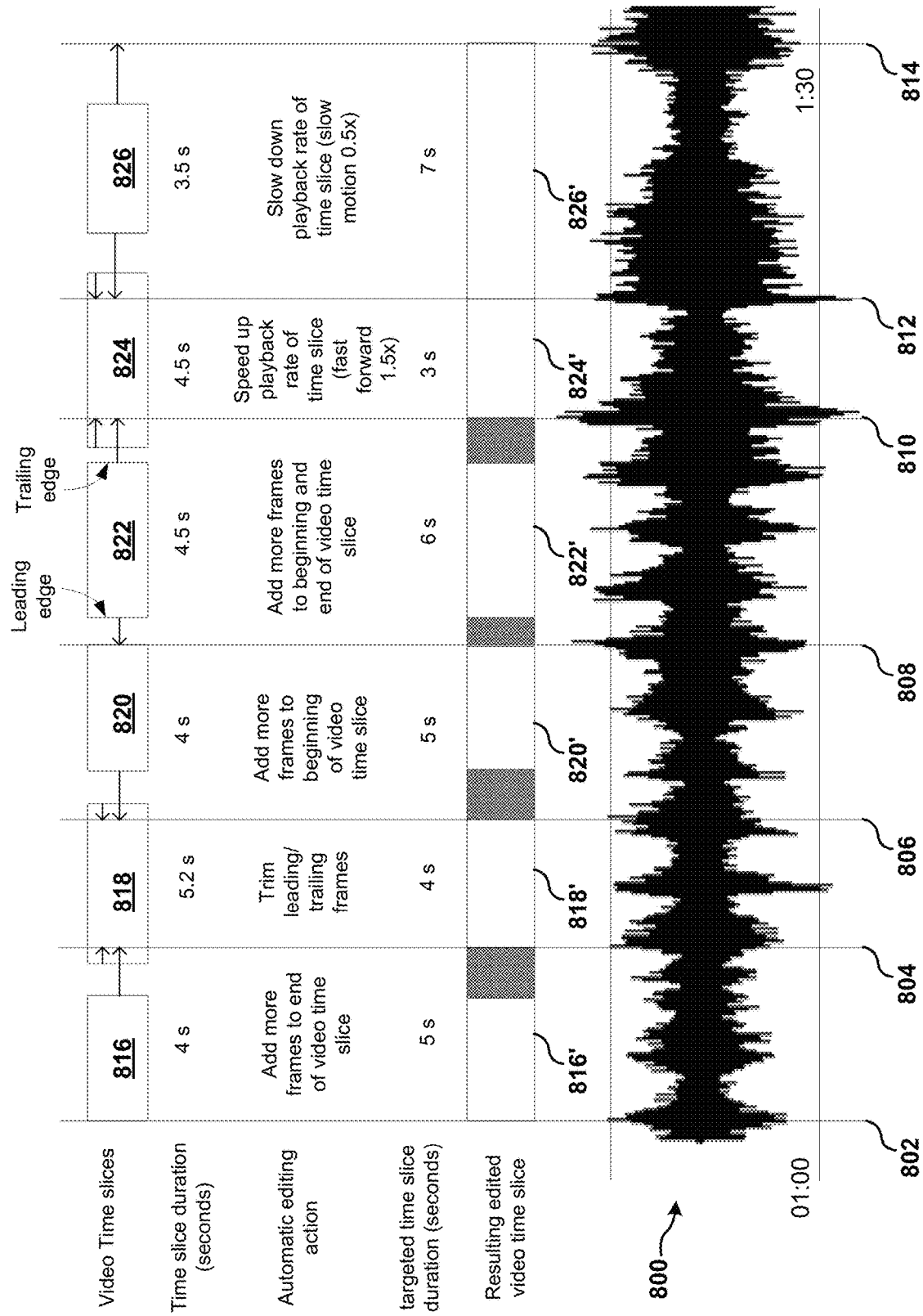
FIG. 8 includes a conceptual illustration of various processes for editing or cutting video time slices to fit to markers identified from a music track such that changes of scenes between sequential video time slices are made to correspond to the markers, according to various embodiments.

In operation 260, the method serves to edit the video time slices to fit to the windows that they are respectively mapped by cutting the video time slices out of the continuous video game session file to fit to the window. This may involve effectively trimming down a video time slice, adding video frames to one or both ends of the video time slice, speeding up or slowing down the video time slice to fit the window. Various embodiments of editing video time slices to fit to windows is shown in FIG. 8.

Operation 270 then creates an audio video file (e.g., multimedia file) for the event reel that includes a sequence of video time slices and the music track, wherein the video time slices are arranged within the sequence based on their mapped location to the windows of the music track. The sequence of time slices refers to the set of video time slices that are determined or selected by operation 200 of the method that are to be played in sequence. The video time slices may be drawn and mapped from various segments or portions of a full-length video game session. Therefore, sequential video time slices, although sequential in the event reel, may not be sequential in the full-length video game session. In some embodiments, a later appearing segment of the full-length video game session may be mapped to a video time slice that is earlier in the sequence of video time slices that a video time slice that is corresponds to an earlier appearing segment of the full-length video game segment. Nevertheless, in some embodiments, sequential video time slices may well refer to respective segments that are contiguous within the full-length game session.

Figure 3A:
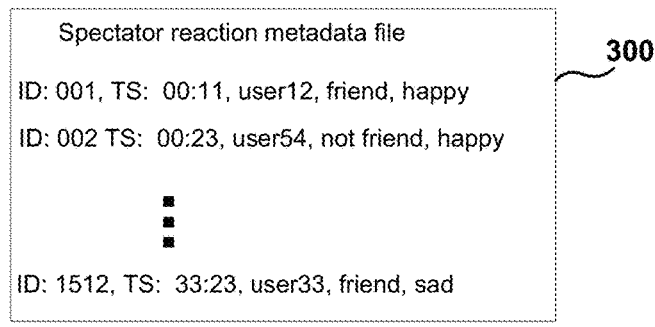
FIG. 3A shows an embodiment of a spectator reaction metadata file recording spectator reactions while watching video game being played.

FIG. 3A shows an embodiment of a spectator reaction metadata file recording spectator reactions while watching video game being played. The metadata file includes various entries for discrete reactions sent by spectators. Each entry is shown to include a reaction identifier, a timestamp, a sender identifier, a friend status, and a reaction value. The spectator metadata file may be recorded by the game service provider or the live streaming service provider. Depending on the gaming session, a spectator metadata file may have anywhere between about 10 reaction entries or less to about 1 million reaction entries or more.

Figure 3B:
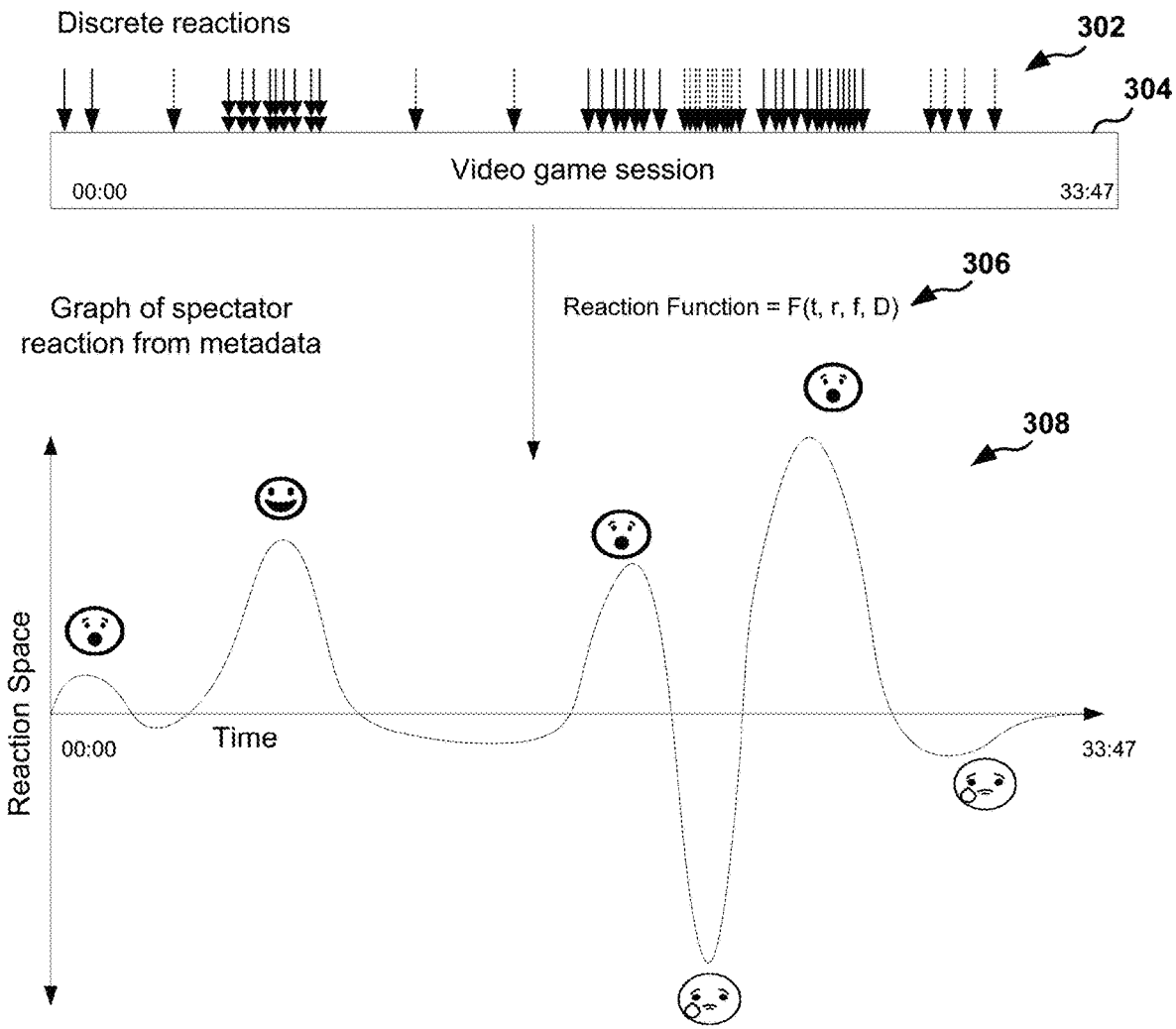
FIG. 3B shows a conceptual illustration of a reaction function that maps discrete timestamped reactions to a reaction space for an exemplary video game segment, according to one embodiment.

FIG. 3B shows a conceptual visualization of how discrete reactions 302 from a spectator reaction metadata file for an exemplary video game session are processed and mapped to reaction space. Discrete reactions 302 are shown as individual arrows that point to a corresponding time on horizontal edge of video game session 302 representing a time course of the session. The example game session is shown to run for 33 minutes and 47 seconds. In the embodiment shown, solid arrows represent a "surprised" or "amazed" reaction, while double arrowhead arrows represent a "happy" or "joyous" reaction and dashed arrows represent a "sad" or "crying" reaction.

A reaction function 308 is shown to map the discrete reactions into reaction space that is illustrated by graph 308. The reaction function 308 is shown to be a function of discrete events r, time t, friend status f, and decay function or factor D. As a result, graph 308 is contemplated to show the collective audience reaction as a function of time that describes the timing of the audience reaction as well its intensity (e.g., amplitude).

It is noted that the reaction graph is shown in 2-dimensional space for clarity. However, in certain embodiments, reaction space may be defined by n-dimensional space, where n is equal to the number of kinds of reactions (e.g., happy, ecstatic, grinning, smirking, etc.), or where n is equal to a definable number of general categories of those kinds of reactions (e.g., happy, sad, etc.).

Figure 4:
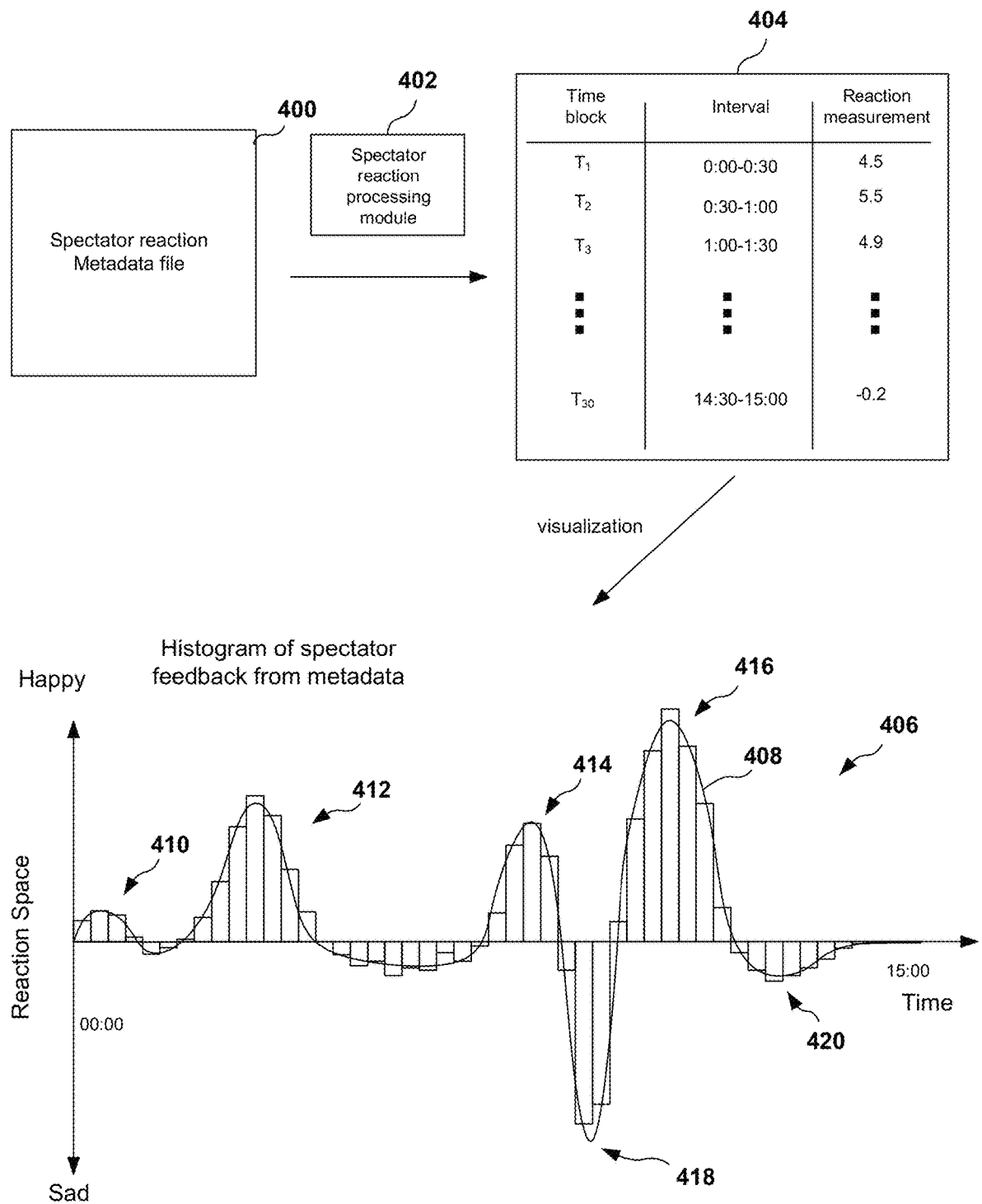
FIG. 4 shows another embodiment of mapping discrete reactions recorded by a spectator reaction metadata file to reaction space.

FIG. 4 shows an additional embodiment for processing reaction data from a spectator reaction metadata file 400. In this embodiment, the spectator reaction processing module 402 processes the spectator reaction metadata file 400 and outputs reaction measurement data 404. The spectator reaction processing module 402 is shown to sort the discrete reactions into time blocks depending on the timestamp for discrete reactions. For example, time blocks $T_1, T_2, T_3, \ldots, T_{30}$ are each shown to represent intervals of 30 seconds.

Every reaction that has a time stamp between 0 minutes and 0 seconds and 0 minutes and 30 seconds would be sorted to $T_1$, and every reaction having a time stamp between 0 minutes and 30 seconds and 1 minute and 0 seconds would be sorted to $T_2$, and so on.

The spectator reaction processing module 404 is shown to calculate a reaction measurement for each of the time blocks depending on the discrete reactions that occur during respective time blocks. In some embodiments, the calculation may involve a summation of a total number of reactions occurring within a time block. In other embodiments, the calculation may involve a summation of discrete reactions that are weighted based on whether the reaction is sent by a friend or follower. The weighting may further account for a reaction history of a user to normalize users with a higher frequency of reactions to users with a lower frequency of reactions. The weighting may also counter for "spamming" of reactions, where a user repeatedly sends reactions that are not meaningful.

In some embodiments, certain reactions may oppose one another, or represent competing sentiments. For example, in some embodiments, a happy reaction may cancel out a sad reaction for calculation purposes. In accordance with these embodiments, the following equation may be used to determine a reaction measurement for a given time block.

$$\text{Reaction Measurement for } T_x = \Sigma_{i,j=0}^{n,m} r_{H,i} \times w_i - r_{S,j} \times w_j \quad (1)$$

In equation (1), $r_{H,i}$ for i=0 to i=n is defined as the set of "happy" reactions occurring within time block while $r_{S,j}$ for j=0 to j=m is defined as the set of "sad" reactions occurring within the same time. Both $r_{H,i}$ and $r_{S,j}$ are shown to be weighted by weighting factor $w_i$ and $w_j$, respectively. In some embodiments, a reaction from a friend will be weighted more than a reaction from a stranger.

Histogram 406 of FIG. 4 shows reaction measurements for 30 time blocks of 30 seconds each over the course of a 15-minute game session. An overlay of continuous function 408 such as one obtained by reaction function 306 of FIG. 3 is shown for comparison. As shown by histogram 406, there are peaks and valleys associated with the reaction measurements depending on the reaction data. For example, peaks 410, 412, 414, and 416 may reflect moments of the gaming session during which the audience reaction was predominantly happy or positive. On the other hand, valleys 418 and 420 show moments during the game session in which the audience reaction was predominantly sad or negative. As a result, the spectator reaction processing module 402 described here is able to calculate moments during a given game session in which the audience had a strong reaction, whether positive (e.g., happy) or negative (e.g., sad).

The spectator reaction processing module 402 and the reaction function 306 are embodiments that allow the systems and methods described here gauge the collective reaction type as well as the reaction intensity as the game session courses through time. Such gauging of reaction type and intensity as a function of time is usable for determining the temporal coordinates of the video time slices to be used for creating an event reel.

Figure 5:
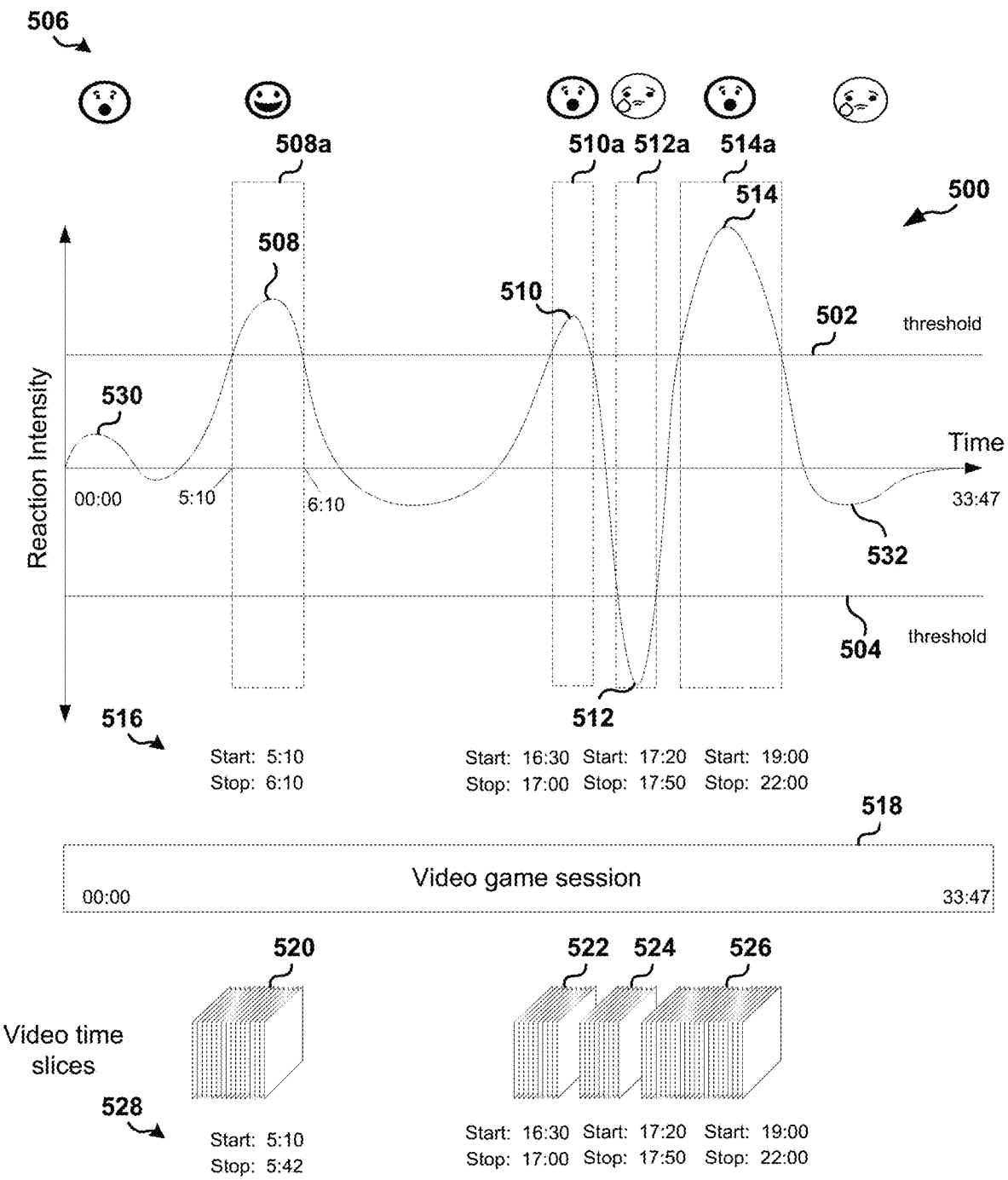
FIG. 5 shows a conceptual illustration of a process for automatically identifying video time slices from the video game segment that correspond to segments of interest to the reacting audience, according to one embodiment.

FIG. 5 shows a conceptual illustration of a process for automatically identifying video time slices from a video game session that correspond to segments of interest for a reacting audience, according to one embodiment. FIG. 5 shows a representation of a reaction graph 500 that graphs in reaction space as a function of time. The reaction graph 500 is produced by processing spectator reaction data associated with the video game session 518 such as by processes shown in FIGS. 3B and 4, according to one embodiment. The reaction graph 500 is associated with reaction types 506 for each of the notable peaks and valleys. The reactions types 506 shown, including surprised, happy, and crying, are only a subset of the different types of reactions that are measurable in embodiments contemplated here.

Also shown in reaction graph 500 are intensity thresholds 502 and 504, which represent an intensity cut-off for determining which moments of the video game session 518 should be identified as video time slices for inclusion in an event reel. In certain embodiments, event reels are made to include video time slices that are associated with the more intense reactions, where intensity is proportional to the number of reactions for a certain reaction type per unit time or the number of total reactions per unit time (e.g., without respect to reaction type). It is contemplated that greater numbers of reactions per unit time will correlate strongly to moments of the video game session that are of interest to the spectator.

Thresholds such as intensity thresholds 502 and 504 are contemplated to be a way to determine which moments of a gaming session are to be included in an event reel, as well as the timing (e.g., start time and stop time) for those moments. For example, moments that surpass intensity threshold 502 and intensity threshold 504 are identified for inclusion and moments that do not are configured to be excluded. FIG. 5 shows peak 508, peak 510, and peak 514 as moments that surpass intensity threshold 502 for positive reactions and valley 512 to surpass intensity threshold 504 for negative reactions. As a result, bounded boxes have been drawn for each of peaks 508, 510, and 514, and valley 512 to indicate that each of those moments have been identified as well as the temporal dimensions for each moment (e.g., start time and stop time).

For example, peak 508 is shown to be associated with bounded box 508a having time coordinates 516 of 5:10 and 6:10. The time coordinates 5:10 and 6:10 correspond to the time at which reaction graph 500 first intersects or exceeds positive intensity threshold 502 and the time at which it drops below the intensity threshold 502, respectively. The time coordinates may then be used to identify the time coordinates 528 of game session (e.g., the set of video frames) for including in the video time slice 520 for inclusion into the event reel.

Each of the peaks 510 and 514 and valley 512 define bounded boxes 510a, 512a, and 514a, respectively, depending on the time coordinates 516 in which the reaction graph 500 surpasses either the intensity threshold 502 for positive reactions (e.g., peaks 510 and 514) or the intensity threshold 504 for negative reactions (e.g., valley 512). Each of video time slices 522, 524, 526 have time coordinates 528 that are defined by the time coordinates 516 of the bounded boxes 510a, 512a, and 514a, respectively, according to some embodiments. As a result, thresholds such as intensity thresholds 502 and 504 may be used to identify time coordinates for video time slices for creation of event reels.

Figure 6:
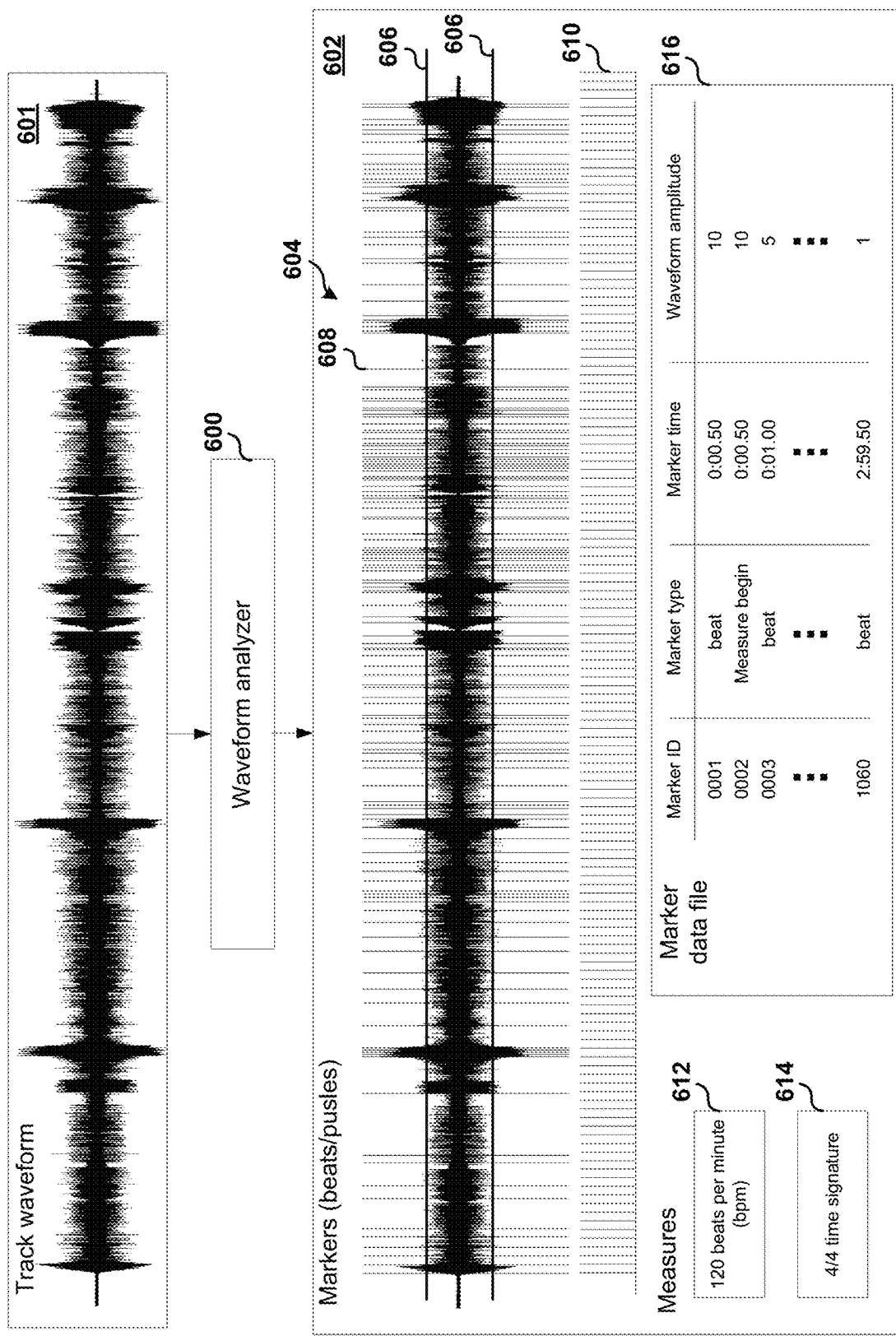
FIG. 6 shows a conceptual illustration of a waveform analyzer for identifying markers within a music track for syncing video time slices with, according to one embodiment.

FIG. 6 shows a conceptual illustration of analyzing a waveform 601 with a waveform analyzer 600 to produce waveform data 602. According to the embodiment shown, the waveform analyzer 600 is configured to generate waveform data 602 that includes markers 604 associated with beat or pulses within the waveform 601 of the track, the measures 610 of the track, the tempo 612 of the track, the time signature 614 of the track, and a marker data file 614 for the markers. In one embodiment, the waveform analyzer 600 may use amplitude threshold 606 to identify markers 604 that correspond to beats of the track. As noted above, the amplitude of the waveform 601 represents the relative energy output in terms of pressure waves of a track. Higher amplitudes correspond to louder and stronger sounds such as beats of a track. As a result, amplitude threshold 606 may be used to identify the beats of a song.

As shown in the waveform data 602, each vertical line superimposed on the waveform represents a marker. For example, marker 608 represents a beat in the track where the amplitude of the waveform exceeds amplitude threshold 606. In some embodiments, songs may be identified to have several hundred or more markers. For example, a 3-minute song with a tempo of 120 beats per minute (bpm) will have about 360 beats. Depending on the nature of the song, each beat may be identified with a unique marker. However, in other songs, not every "beat" is loud or strong enough to be identified with a marker. For example, some beats may be deemphasized or skipped altogether such that markers are not identified for the deemphasized or skipped beats in some embodiments. In still other songs, particularly bass-heavy songs and popular music, half-time may used such that, for example, two beats may be played for during a period in which one beat would otherwise be played. As a result, markers may be identified for half-time beats as well.

In addition to the markers 604 identified for beats shown in waveform data 602, some embodiments may also identify markers for the measures of the track. In one embodiment, each downbeat (e.g., the first beat of a measure) is provided a marker whether the waveform amplitude associated with the downbeat exceed the amplitude threshold or not.

Also shown in FIG. 6 is marker data file 616 that includes timing information for each of the identified markers, which may be used for temporal synchronization of video time slices to the music track. In the embodiment shown, each marker identified by the waveform analyzer is stored in the marker data file 616 with a unique marker identification, the marker type of the identified sound, the marker time of the sound, and the waveform amplitude of the sound. In some embodiments, a given beat may have more than one marker. For example, the beat at 0 minutes 0 seconds and 500 milliseconds (e.g., maker time=0:00.50) is shown to be identified as both a beat and a measure begin (e.g., the beginning of the measure).

Figure 7:
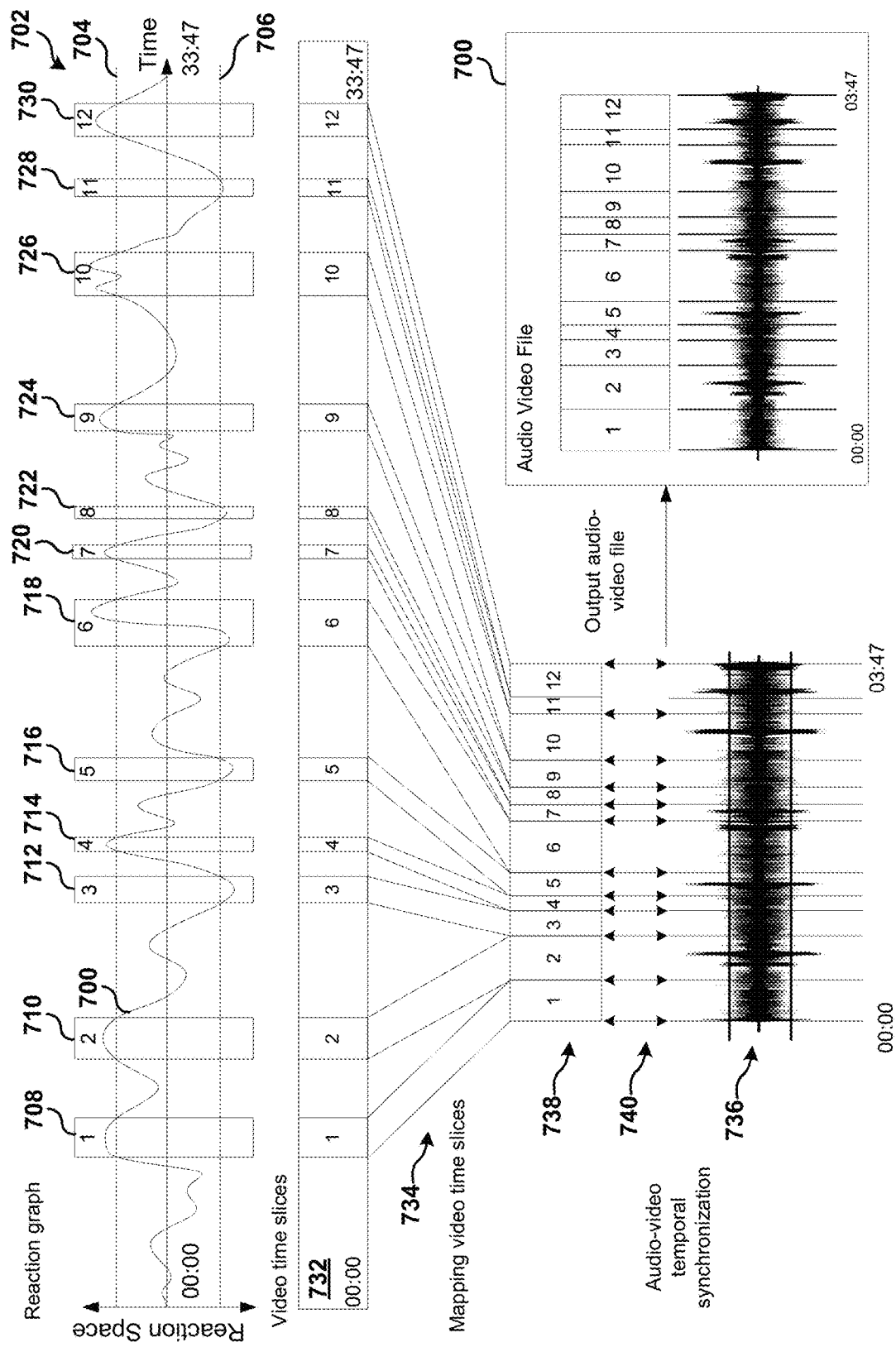
FIG. 7 shows a conceptual illustration of mapping video time slices identified from a video game segment to a music track, wherein transitions between sequential video time slices are mapped to markers identified within the music track, according to one embodiment.

FIG. 7 shows a conceptual illustration for creating an event reel 701 based on the methods of identifying video time slices shown in FIGS. 4 and 5 and methods of identifying markers within a music track such that shown in FIG. 6. A reaction graph 700 is shown to be plotted for a game session 732 lasting 33 minutes and 47 seconds. Thresholds 704 and 706 are shown to be used to gate the game session 732 for moments that should be included in the event reel 700. The gating process is shown to identify 12 discrete moments 708-730 for inclusion in the event reel. For each of the moments 708-730, there is at least one point along the reaction graph 700 that surpasses either threshold 704 or threshold 702.

While in some embodiments the temporal coordinates for video time slices are determined based on when the reaction graph exceeds the threshold and then drops below the threshold, this does not necessarily have to be the case. For example, there is a moment 718 in which the reaction graph trends in the negative direction and immediately trends positive, crossing thresholds 706 and 708 in a relatively short period of time. As a result, the bounded box 6 indicating the time coordinates for moment 718 and the resulting video time slice 6 are shown to include a valley that crosses threshold 706 and a peak that crosses threshold 704. As a result, the video time slice 6 associated with moment 718 will include captures both a predominantly sad or negative moment as well as a predominantly happy or positive moment in one continuous video time slice.

Moment 726 is also shown to include two distinct peaks that exceed threshold 704 in quick succession. As a result, the bounded box 10 is shown to begin at the time when the first peak crosses threshold 704 and end when the second peak drops below threshold 704. It is contemplated that certain moments are better conveyed to the viewer when they are replayed as one continuous video time slice instead of being broken into two or more video time slices. This may be the case for peaks and valleys that occur in quick succession of each other, indicating that the reaction peaks and valleys are directed to a coherent game scene.

FIG. 7 also shows the video time slices 1-12 that are identified based on the bounded boxes 1-12 for each of the moments 708-730. Each of the video time slices 1-12 are then mapped by mapping 734 to temporal locations of the music track 736 to create a sequence 738 of video time slices for the event reel 700. The video time slices 1-12 will generally have time coordinates (e.g., start time and stop time) that correspond with the time coordinates of the respective bounded boxes 1-12 for moments 708-730. However, in some circumstances, the time coordinates of the video time slices 1-12 may be adjusted to fit to the markers within the music track 736. Fitting of video time slices to markers is discussed in more detail with respect to FIG. 8. Also, while mapping 734 is shown to have mapped the video time slices 1-12 in the same temporal order as the appear in the game session 732 for the sequence 738, this need not necessarily be the case. For example, in some embodiments, video time slices that occur later in the game session 734 may be mapped to sequence 738 to precede a video time slice that occurs earlier in the same game session 734.

The sequence 738 of video time slices is shown to be temporally synchronized 740 to the music track 736. For example, video time slice 1 is shown to have a start time coordinate that corresponds to the first marker for the first note or beat of the music track 736. In some embodiments, the creation of an event reel is configured to begin playing the first video time slice the same time that the music track begins playing. However, this need not always be the case. The first video time slice is also shown to stop playing around the same time that the second marker appears on the music track 736. At the time coordinate of that marker, the sequence 738 cuts or transitions to the second video time slice. As a result, the transition or change of scene between the first and second video time slices is made to occur around the same time that a beat occurs in the music track 736. Each of the remaining 10 changes of scenes between the remaining video time slices are also shown to occur "on-beat," for example around the same time that a beat occurs in the music track 736. As a result, the sequence 738 of video time slices and the music track 736 can be said to be temporally synchronized, since the transitions between the video time slices that make up the sequence 738 occur at around the same time as a beat in the music track 736. The resulting audio video file for the event reel 700 is therefore temporally synchronized between audio and video.

FIG. 8 includes a conceptual illustration of various processes for editing video time slices to fit to markers identified from a music track. As used here, fitting a video segment such as a video time slice to a set of markers refers to a video editing process that causes the video segment to begin playing at a first temporal marker and to stop playing at a second temporal marker. Some of the various video editing processes for fitting video time slices to markers are discussed below.

FIG. 8 shows a waveform 800 for a section of a music track running from 1 minute into the track to 1 minutes and 30 seconds into the track. The waveform 800 is shown to be overlaid with markers 802-814 that are identified from the waveform based on amplitude analysis of the waveform 800. As a result, each of the markers 802-814 is associated with a beat of within the music track.

In the embodiment shown, none of the five video time slices 816-826 fit to the identified markers 802-814. For example, video time slice 816 is shown to be 4 seconds long whereas the duration between marker 802 and marker 804 is shown to be 5 seconds long. As noted above, the time coordinates (and also duration) for each of the video time slices is determined by examining when a reaction graph ascends beyond a certain threshold and when it subsequently descends below the threshold. Many video time slices will therefore not be of a duration that fits to the markers of a given music track. Video time slice 816, for example, is therefore processed with an automatic editing action that effectively adds video frames from the game session the tail end of video time slice 816 to produce an edited video time slice 806' that has a length of 5 seconds. In some embodiments, the automatic editing action can calculate the number of frames that are to be added to the video time slice 816 based on the frame rate of the game session and the amount of time that needs "filled in." In the example shown, video time slice 816 is 1 second short of the target. Thus, if the frame rate of the game session is 30 frames per second (fps), then it is contemplated that the automatic editing action is configured to add 30 frames to the video time slice 816 for the edited video time slice 816'. Although referred here as adding video frames to the video time slice 816, it is understood that this also refers to the equivalent of editing the game session video segment to create the edited video time slice 816'.

In some embodiments, certain video time slices extend for a time that is longer than the targeted time based on the markers for the music track. For example, the amount of time between markers 804 and 806 is shown to be 4 seconds, whereas video time slice 818 that has been mapped to this 4 second stretch of music track is shown to be 5.2 seconds long. It is contemplated that automatic editing may recognize and calculate the discrepancy between the actual duration of the video time slice 818 and the targeted time slice duration to determine how many frames to trim from the video time slice 818. In the embodiment shown, the automatic editing action would be to effectively trim 1.2 seconds off video time slice 818 to produce edited video time slice 818' having a duration of 4 seconds. In some embodiments, the automatic editing will trim video frames from the leading end of the video time slice, or the trailing end the time slice, or both. In some embodiments, where the trimming occurs will depend upon the reaction graph. For example, if the leading edge of the video time slice is closer in time to the apex of the reaction graph than the trailing edge, then the automatic editing may be configured to trim frames from the trailing edge of the video time slice rather than from the leading edge.

Also shown in FIG. 8 are video time slices 820 and 822, both of which are shorter in duration than the target duration as indicated by the stretch of time between markers 806 and 808, and markers 808 and 810, respectively. For video time slice 820, the automatic editing adds more frames to the leading edge to produce edited video time slice 820'. For video time slice 822, the automatic editing is shown to add more video frames to both the leading edge and the trailing edge to produce edited video time slice 822'. Again, the automatic editing may choose between adding video frames the leading edge, the trailing edge, or both edges depending upon the reaction graph.

FIG. 8 shows two additional embodiments of processes for obtaining fit of video time slices to the targeted durations as indicated by markers of the music track. For example, video time slice 824 is shown to be 4.5 seconds long, while the targeted duration between markers 810 and 812 is shown to be 3 seconds long. It is contemplated that one way to fit longer video time slices into shorter target periods is to configure the video time slice to be played at a faster rate. For example, video time slice 824 is shown to configured to be sped up in playback speed by a factor of 1.5× for edited video time slice 824'. In some embodiments, the entire video time slice 824 may be sped up by 1.5×. In other embodiments, video time slice 824 may be sped up dynamically such that certain parts of the video time slice 824 is configured to be presented faster than other parts, as long as the average factor of speeding up is 1.5×.

Video time slice 826 is shown to be shorter in duration than the targeted duration between markers 812 and 814. As a result, the automatic editing may slow down the configured playback speed of video time slice 826 to 0.5× relative to the "real time" playback speed of 1×. As a result, the automatic editing produces an edited video time slice 816' having a duration that matches the duration between markers 812 and 814. The resulting sequence of edited video time slices 816'-826', when played one after the other is therefore temporally synchronized to markers 802-816 of the music track such that every change of scene between sequential edited video time slices 816'-826' occur around the same time that a beat occurs.

Figure 9:
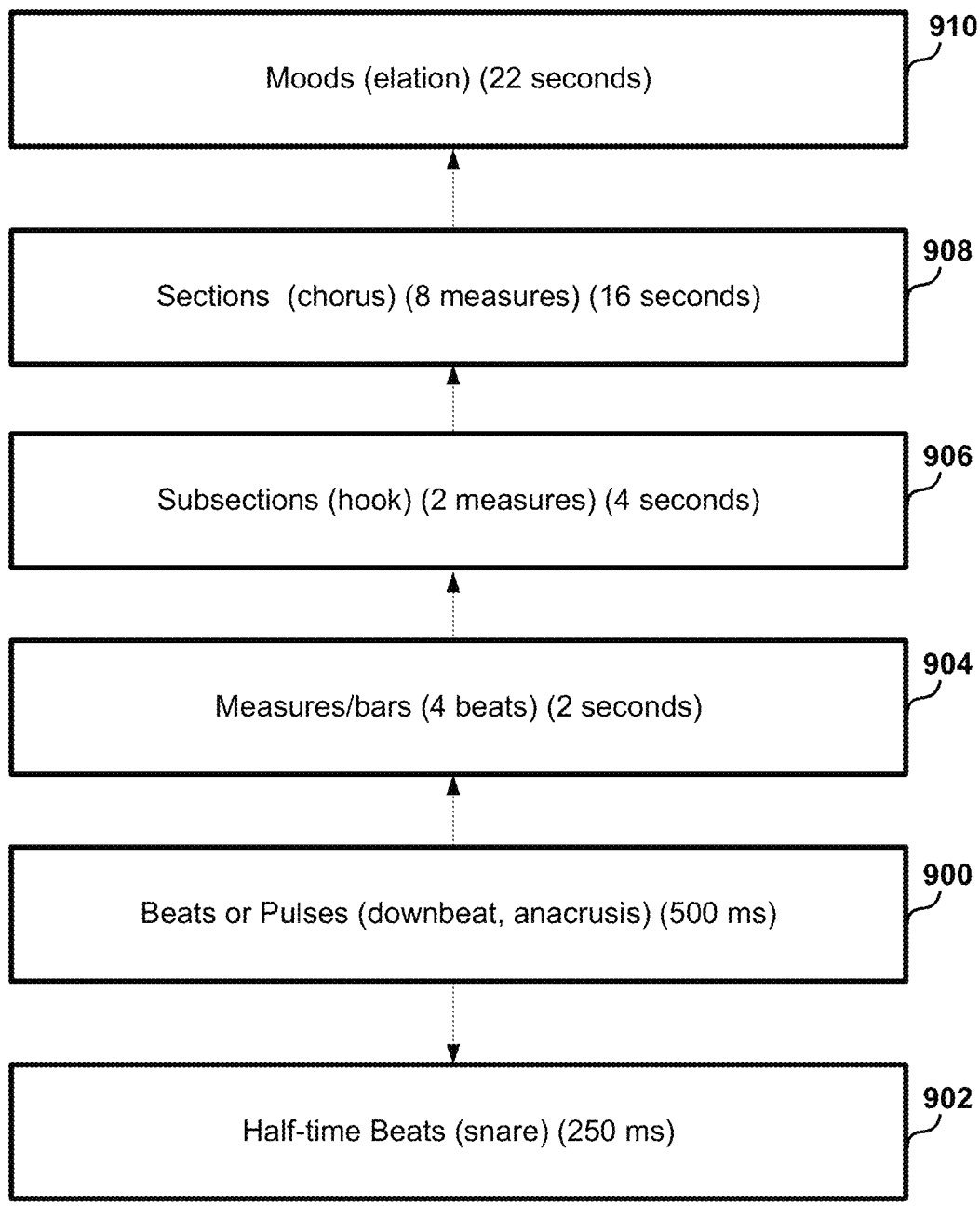
FIG. 9 shows a hierarchical structure of musical properties of a music track that may be identified and used for the mapping of video time slices of a video game segment to a given music track, according to one embodiment.

FIG. 9 shows a hierarchical structure of musical properties of a music track that may be identified and used for the mapping of video time slices of a video game session to a given music track, according to one embodiment. The most basic building block of a music track includes the beats 900 or pulses of that track. Methods and systems described here are configured to identify the beats 900 of a music track with markers. In addition to beats 900, certain tracks may include half-time beats 902, or beats between beats. Half-time beats are also configured to be identified by markers. Another building block of a music track includes the measures 904, also sometimes known as bars. Each of the measures 904 comprises a certain number of beats depending upon the music signature of the track. In many popular songs, each measure includes 4 beats, although other songs may have 3, 5, 6, 7, 8, or other number of beats that make up each measure. In the embodiments described here, measures are configured to be identified by markers, which, for example, identify the first beat (downbeat) of a measure, or the last beat of a measure (upbeat). In some embodiments, the method or system is configured to be biased towards temporal synchronization with measures of a song such that changes of scenes between video time slices occur at a similar time as downbeats of a measure, if possible.

The next hierarchal layer in FIG. 9 is shown to be subsections 906, which refer to portions of a music track that the producer or composer has included to serve a certain purpose for the track. In certain embodiments and for certain tracks, a subsection's purpose is relative to the section in which it is included. For example, subsections 906 may include a "hooks," "drops," "riffs," and other musical properties that provide a certain intended effect to the section of the track where it is placed. Subsections 906 may be used to draw contrast between sections of a song, to build momentum for a section of the song, to slow down momentum for a section of the song, to accent a portion of the song, to refer back to a portion of the song, or otherwise provide an effect to a section of a song.

Subsections 906 may be identified by embodiments described here with indicators that refer to the time coordinates (e.g., start time and stop time) of the subsection. Indicators of subjections 906 may occur anywhere between about 1 and about 50 times within one song. Indicators of subsections are configured to be used for both temporal synchronization as well as for achieving audio-video complementarity for an event reel. For example, it is contemplated that video time slices of higher intensity game play may be mapped preferentially to subsections that are indicated to be musically intense or momentum building or energy releasing. On the other hand, video time slices of lower intensity may also be preferentially mapped to subsections that are indicated to be sections of the music intended to slow down momentum, or are otherwise of lower music intensity. Music subsections may range in duration anywhere between about 0.5 measures to about 8 measures or more.

The next layer in the hierarchal structure of song structure is shown to be sections 908, which may include portions of a track referred to as intros, expositions, verses, pre-choruses, choruses, vocal sections, instrumental sections, interludes, developments, recapitulations, middle-eights, outros, codas, etc. Sections 908 are included in a track by a producer or composer to serve an intended purpose for the narrative or arc of a song. It is contemplated that sections 908 are configured to be identified by indicators that are defined by the start time and stop time for the sections 908. For example, an indicator for a chorus may be defined by the section type of the section, the section start time, and the section stop time.

In some embodiments, it is contemplated that method or systems described here may be caused to preferentially map video time slices to the time coordinates of at least a portion of the music sections 908. In one embodiment, every identified music section's start time coordinate is mapped with a video time slice such that a change of scene occurs at the beginning of each of the sections 908. Moreover, it is contemplated that certain embodiments may be preferentially configured to map video time slices to certain sections 908 to enhance the audio-video complementarity of the event reel. That is, for example, video time slices of lower intensity may be mapped to sections 908 that are indicated to be of lower musical intensity such as the intro, the interlude, or the outro, etc. On the other hand, video time slices of higher intensity may be mapped to sections 908 that are indicated to be of higher musical intensity such as choruses or recapitulations. Sections 908 of a music track may be built from anywhere between 1 measure to about 16 or more measures.

Moods 910 are another hierarchical layer of the structure of a song. A song may cycle between a range of 1 to about 10 different moods. Some exemplary moods 910 include anger, determination, fear, sadness, calmness, silliness, elation, positivity, negativity, ambivalence, funkiness, etc. Embodiments are able to identify moods 910 with mood tags to portions of a music track, where portions may be identified by more than one mood tag.

Figure 10:
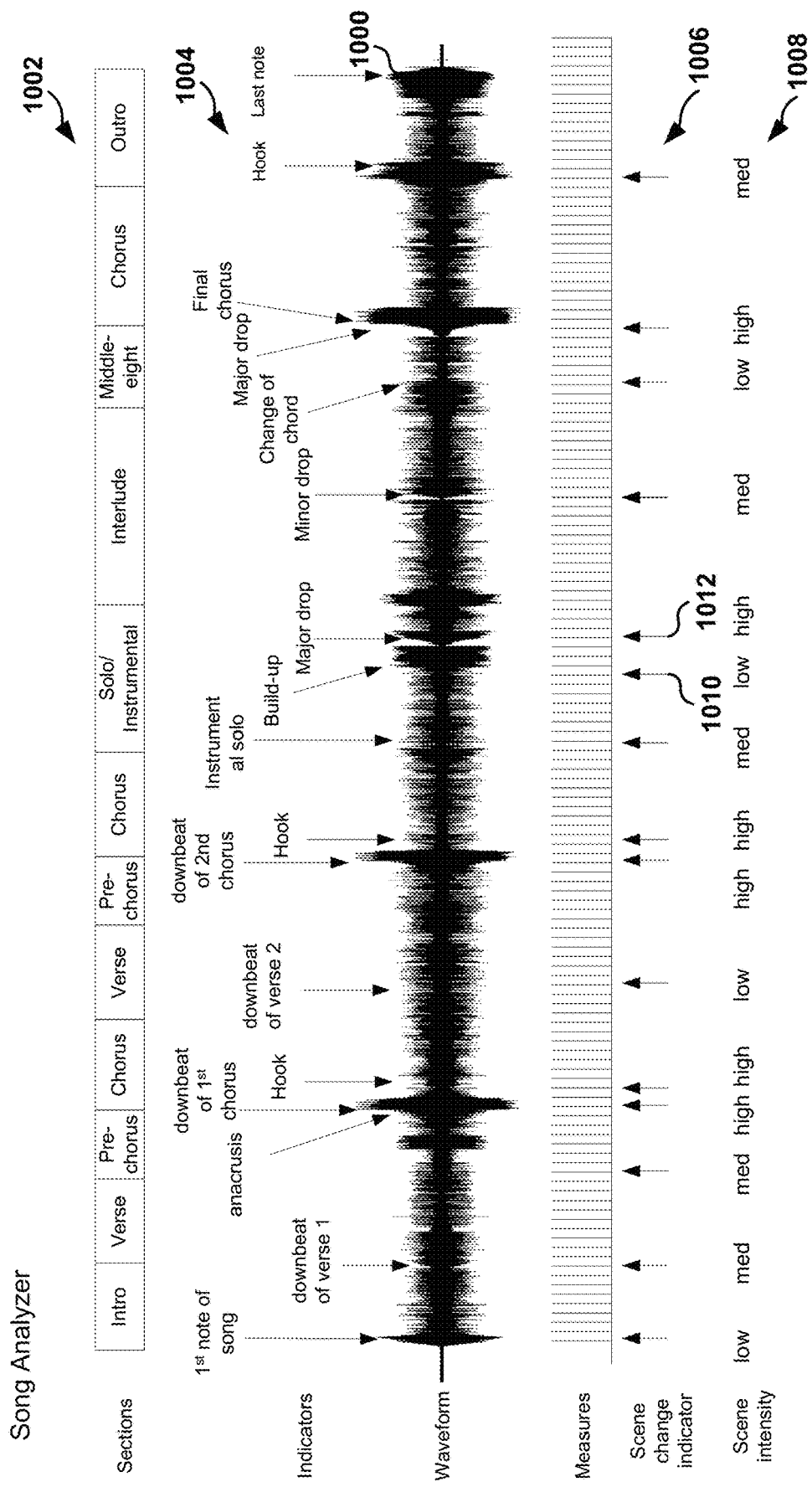
FIG. 10 shows an embodiment of a song analyzer that may be used to identify scene change indicators that correlate to a song's musical properties, according to one embodiment.

FIG. 10 shows an embodiment of a song analyzer that may be used to identify scene change indicators that correlate to a song's musical properties, according to one embodiment. As noted above, in addition to analyzing the waveform 1000 for beats and measures, it is contemplated that the waveform may be analyzed for section and subsections (or simply sections) for temporal synchronicity, audio-video complementarity, and emotional congruence. For example, the song analyzer in FIG. 10 is shown to have identified section indicators 1002 for the track.

In addition to the section indicators 1002, the song analyzer is shown to also identify musical property indicators 1004 based on the waveform 1000. As shown in FIG. 10, the types of musical properties that are contemplated to be identified include notes that begin or end a song, measure, section, or subsection and other musical properties within a section or subsection. Both section indicators 1002 and musical property indicators 1004 may be used to identify time coordinates of the track where it would be fitting to include a change of scene. For example, both section indicators 1002 and musical property indicators are shown to inform where scene change indicators 1ceach of the scene change indicators 1006 are placed. In the particular embodiment shown, there is a scene change indicator 1006 corresponding to the beginning (e.g., the first beat or note) of each of the 12 identified sections 1002. For example, there is a scene change indicator for the downbeat of the first chorus, which may be used to indicate that a change of scenes between sequential video time slices should occur at the time coordinate of the scene change indicator.

In addition to the scene change indicators corresponding to the sections 1002, FIG. 10 shows additional scene change indicators that correspond to certain musical property indicators 1004. For example, there is a scene change indicator that corresponds to an identified hook immediately following the downbeat of the first chorus. As a result, certain embodiments contemplated here are enabled achieve temporal synchronicity of audio and video components that is in addition to being "on beat." That is, for example, audio and video components may additionally be synchronized to the structural properties of a music track such as the sections of the track, as well as other musical properties.

Also shown in FIG. 10 are scene intensity indicators 1008 that are associated with each of the scene change indicators 1006. It is contemplated that the scene intensity indicators 1008 may be identified based on the type of section or musical property that a particular scene change indicator refers to. For example, the scene change indicator for the downbeat of the first chorus is associated with the scene intensity indicator of "high," indicating that a video time slice having a high intensity level should be mapped to the scene change indicator for the first downbeat of the chorus. It makes production sense that a video time slice of higher intensity should be mapped to the chorus since the chorus is usually associated with higher intensity sounds and musicality.

On the other hand, there is a scene change indicator 1010 associated with a scene intensity indicator of "low" corresponding to a subsection of the track that is indicated to be a "build-up" section. The following scene change indicator 1012 corresponds to a music property indicator of a "major drop." As a result, the scene intensity indicator associated with scene change indicator 1012 is "high," reflecting the type of video time slice that is to be mapped to scene change indicator 1012. However, it would make production sense to have a video time slice that is of relatively low intensity precede the video time slice that is to be mapped to scene change indicator 1012 to draw contrast. Thus, the scene intensity indicator of "low" for scene change indicator 1010 makes sense in order to map a video time slice of lower intensity to a time coordinate within the event reel that precedes the video time slice that is to be mapped to scene change indicator 1012.

Thus, embodiments contemplated here are enabled to achieve complementarity between audio and video in addition to achieving temporal synchronicity. As noted above, audio-video complementarity refers herein as the degree of coherence between intensity levels of what audio is playing and what the video is showing.

It is noted that while scene change indicators 1006 may indicate certain time coordinates for mapping video time slices to, the scene change indicators 1006 do not necessarily indicate all of the temporal locations for mapping video time slices to. In some embodiments, the scene change indicators 1006 represent only a subset of the total number of mapping locations for video time slices of a given track. Some embodiments, however, may preferentially map video time slices to according to the scene change indicators over other markers or indicators.

Figure 11:
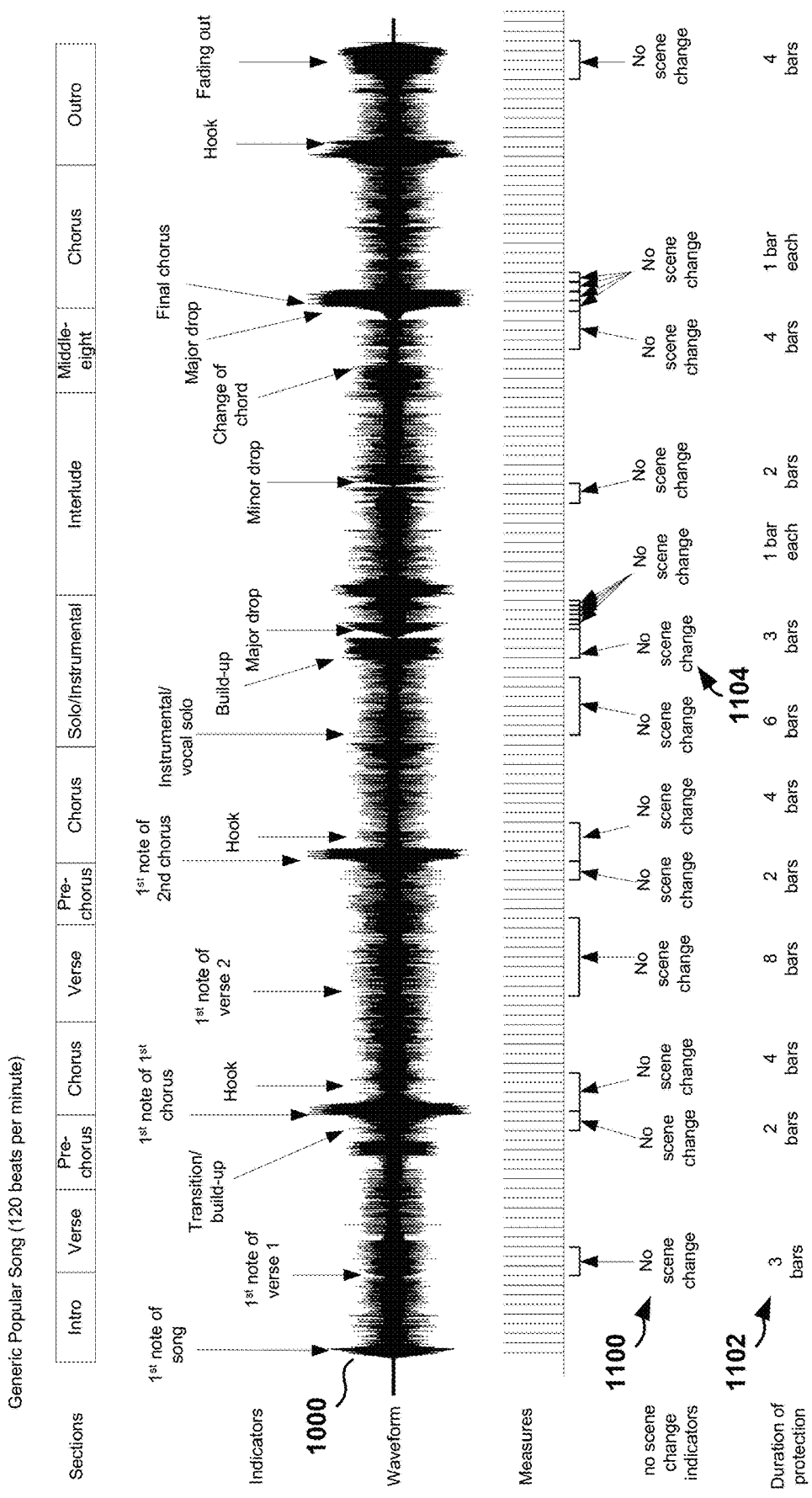
FIG. 11 shows an embodiment of a song analyzer that is enabled to detect portions within a song during which no scene changes should occur based on the musical properties of the song.

In FIG. 10, it was shown how musical properties and structural sections of a track could be used to identify time coordinates within a track where a scene change would make production sense. FIG. 11 on the other hand shows how musical properties and structural sections of a track can be used to identify regions of a track where it would make production sense to not have a scene change. In some embodiments and for some songs, there may be intervals within the song where it would make production sense to have continuous scenes associated with the intervals. That is, it may not make production sense to have a scene change occur during those intervals.

FIG. 11 shows the waveform 1000 being analyzed for no scene change indicators 1100, which are represented by brackets having a length that reflects a duration of the no scene change protection. The duration of protection 1102 from changes of scenes associated with each of the no scene change indicators 1006 is also shown in FIG. 11 in terms of a number of bars. As an example, no scene change indicator 1104 is shown to be associated with a "build-up" within the track preceding a major drop. The duration of protection is shown to be for 3 bars. In some embodiments and for some tracks, it would make production sense to not have a scene change during the interval indicated by no scene change indicator 1104 to enhance the effect of the subsequent "major drop" and the video time slices associate with the "major drop." As a result, a single video time slice may be mapped to the interval associated with the "build-up" and run continuously as the "build-up" is played. In other embodiments, no scene change indicators 1100 are not used for mapping video time slices to the track.

Figure 12:
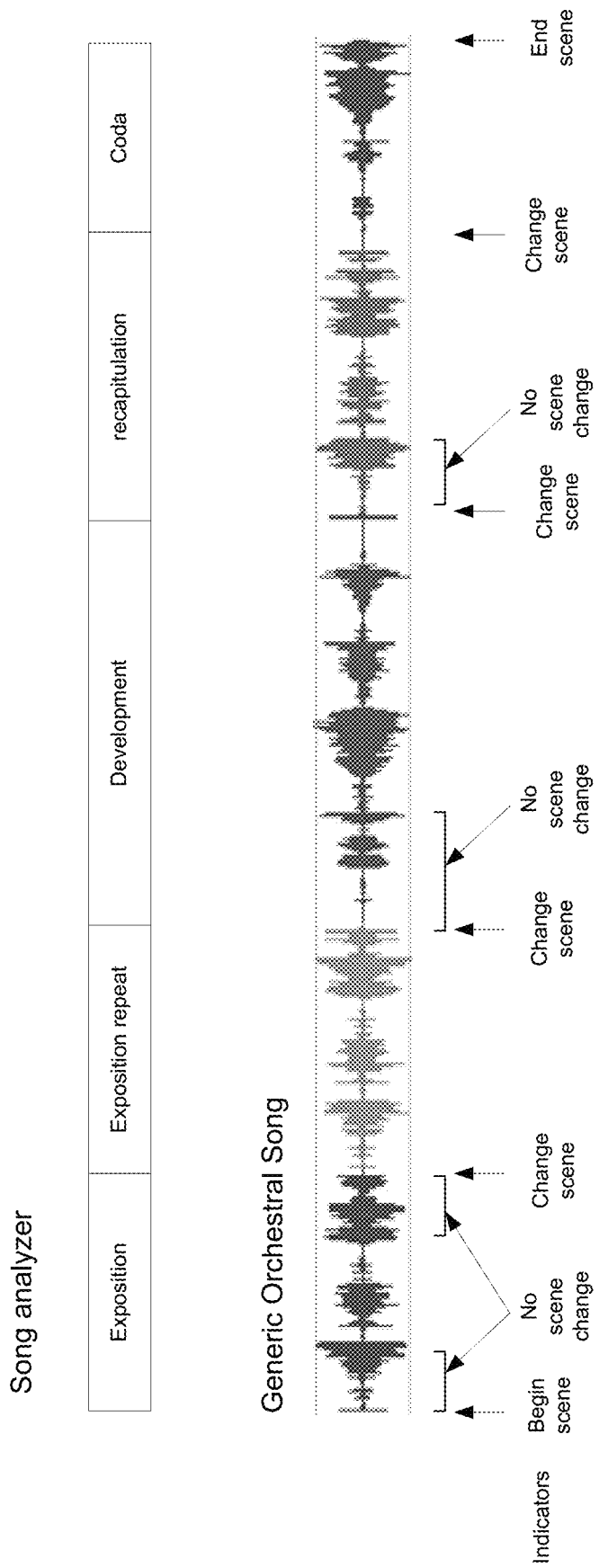
FIG. 12 shows an additional embodiment of a song analyzer that is enabled to identify scene change indicators for an orchestral song.

FIG. 12 shows an additional embodiment of a song analyzer that is enabled to identify scene change indicators for an orchestral song. Orchestral songs may differ from popular or contemporary songs in song structure. Additionally, orchestral songs may not rely on beats has heavily as pop music. In the embodiment shown, the song analyzer is able to identify sections of the orchestral song based on the waveform's representation of various instruments playing. Although not shown, the song analyzer may also in some embodiments be able to identify the musical signature of the track.

Similar to the indicators for scene changes and no scene changes shown in FIGS. 10 and 11, it is contemplated that embodiments described here are able to identify scene change indicators as well as no scene change indicators for the orchestral song. Both scene change indicators and no scene change indicators are shown in FIG. 12.

Figure 13:
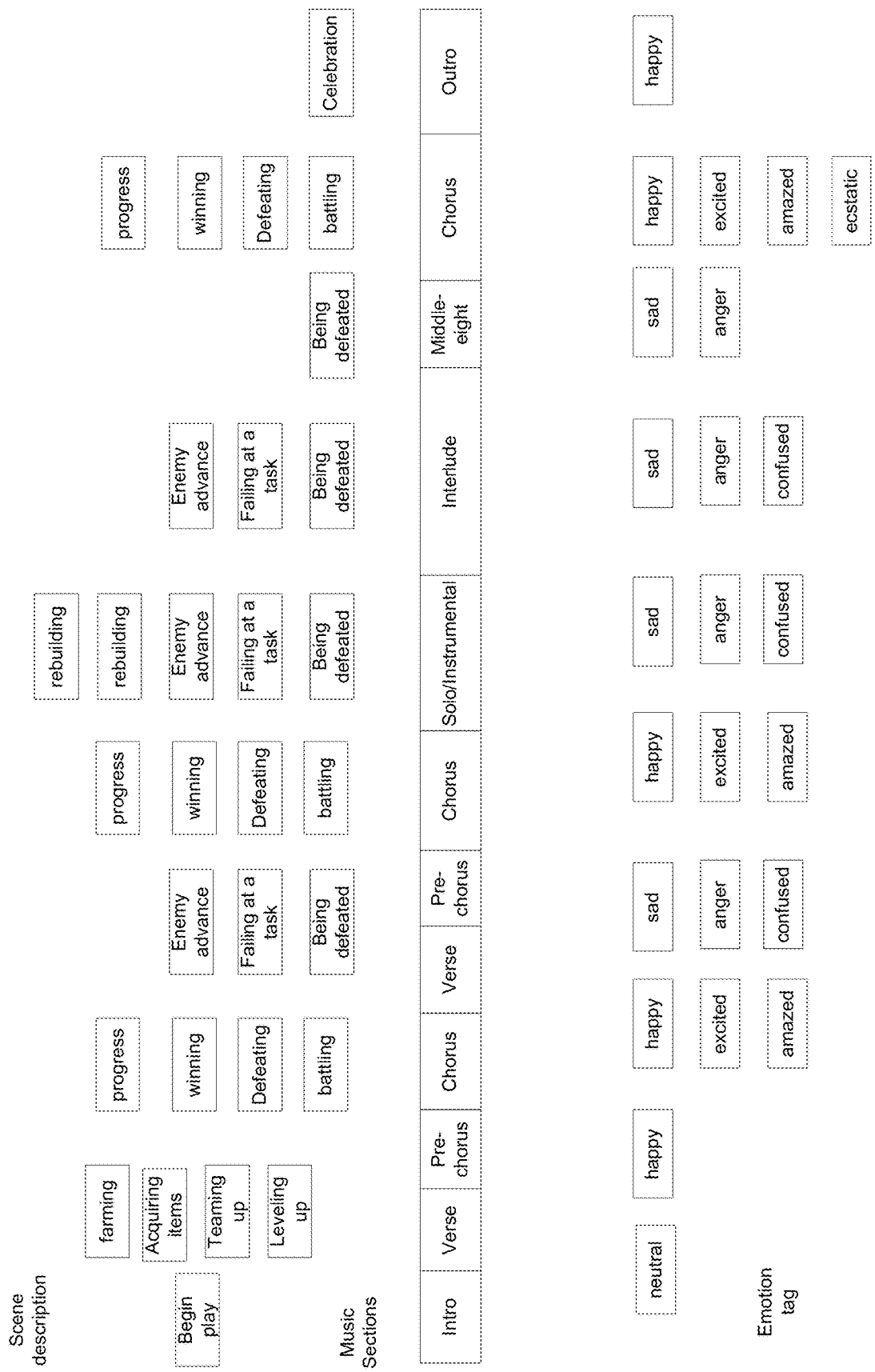
FIG. 13 shows an embodiment for mapping scenes of a video game defined by certain properties to sections of a song defined by certain moods.

FIG. 13 shows an embodiment for mapping scenes of a video game defined by certain properties to sections of a song defined by certain moods. As noted above, in addition to temporal synchronicity (e.g., video is "on beat") and audio-visual complementarity (e.g., intensity of video content matches that of audio content), it is contemplated that event reels described here may also be caused to have emotional congruence between video content and musical content. Emotional congruence is may be defined in one sense by how well the mood associated with a particular video time slice matches the mood of a particular portion of the musical track. Often, there is a natural progression of a music track that invokes various moods. It is contemplated that the mood for portions of a song may be tagged by the song analyzer or by a human listener.

For some embodiments, a song's mood may be determined by lyrical analysis (e.g., analyzing the lyrics for words that indicate a certain moods), or by chord analysis. Certain chords such as minor chords may indicate a sad mood or negative mood, while major chords may indicate a happy or positive mood. A presence of sharp or flat notes may also indicate certain moods such as confusion or disappointment. Additionally, metadata retrieved from third party music streaming platforms that allow live commenting during playback may also be used to extract mood tags for portions of the music track.

FIG. 13 shows a music track that is tagged with emotion tags. FIG. 13 also shows various scenes having a particular scene description. In some embodiments, video time slices may be categorized with scene descriptions based on game state data for the video time slices. The video time slices may be preferentially mapped to portions of the music track according to the scene description associated with the video time slice. For example, a video time slice where the player of the game session is being defeated may be preferentially mapped to the middle-eight of a music track, whereas video time slices where the player is winning or making progress may mapped to the chorus of the music track.

In other embodiments, the spectator reaction data associated with the video time slices may be used to map the video time slices to portions of the song in accordance with the emotional tags for the portions of the song. For example, a video time slice having a predominantly happy reaction may be mapped to a portion of a song that is tagged with a similar emotion tag (e.g., a chorus), whereas a video time slice associated with a predominantly sad spectator reaction may be mapped to a portion of song with a similar emotion tag (e.g., a middle-eight). As a result, embodiments contemplated here are able to achieve emotional congruity between the video content and the audio content in addition to temporal synchronicity and complementarity.

Figure 14:
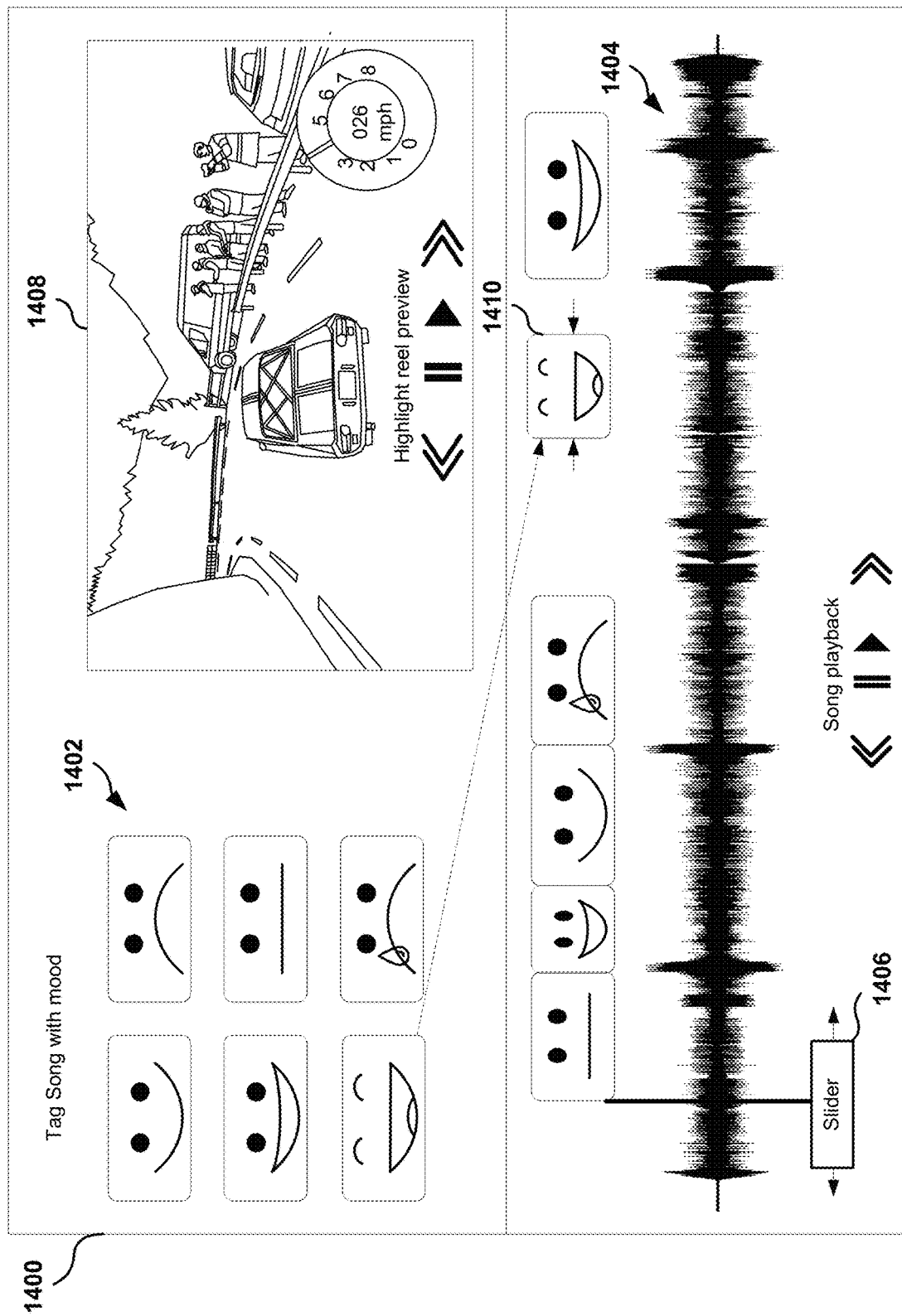
FIG. 14 shows an embodiment of a user interface that may be used to tag various moods to various portions of a song for mapping video time slices to the song.

FIG. 14 shows an embodiment of a user interface 1400 that may be used to tag various moods to various portions of a song 1404 for mapping video time slices to the song. A user may use the user interface 1400 to play song 1404 and tag it with emotion tags 1402 as the user listens to the song 1404. In the embodiment shown, the user may drag an emotional tag 1402 to a corresponding portion of the song 1404 where the listener feels that a certain emotion is being given off by the song 1404. In some embodiments, more than one emotional tag 1402 may be tagged to a given portion of the song 1404.

For the present embodiment, the user is shown to drag emotion tag 1410 to a corresponding temporal location for the song 1404. The user may then drag the flanking ends of the emotion tag 1410 to fit the portion of the song that is perceived to be associated with the emotion of the emotion tag. A slider 1406 may also be provided to the user to travel within the song 1404. Additionally, a viewer 1408 may be provided to the user to review an event reel as it is being generated dynamically in accordance to the emotion tags 1402 being tagged to the song 1404.

Figure 15:
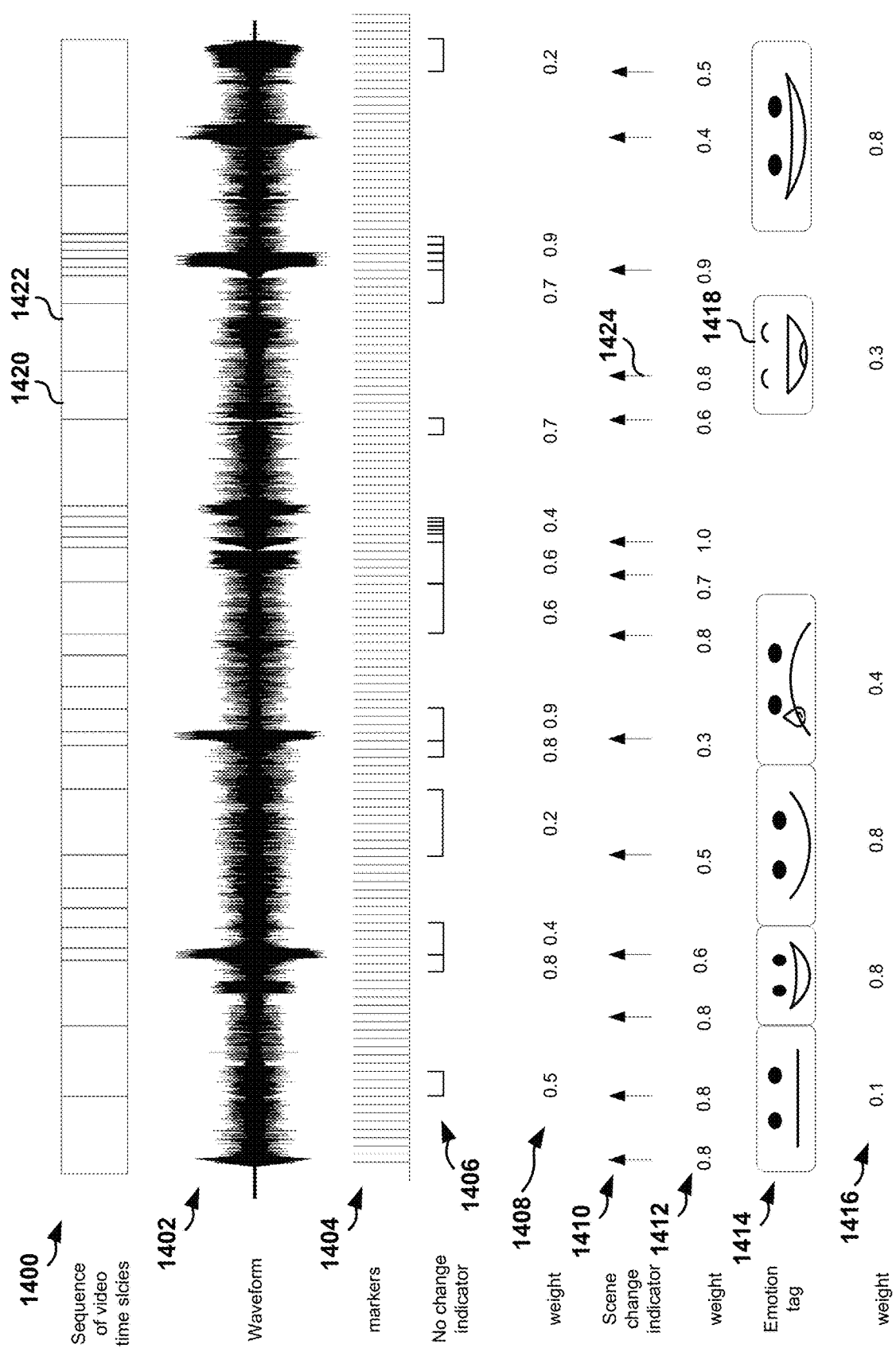
FIG. 15 shows an embodiment for mapping video time slices to a music track using a combination scene change indicators, no scene change indicators, and moods tags for the track.

FIG. 15 shows an embodiment for mapping video time slices 1400 to a music track 1402 using a combination of markers 1404, scene change indicators 1410, no change indicators 1406, and emotion tags for a track 1414, as well as weights 1408, 1412 and 1416. Although not shown, a process for automatic editing the video time slices 1400 may also be implemented with the processes shown in order to fit the video time slices 1400 to the markers and indicators for temporal synchronicity.

Each of the markers 1404, the no change indicators 1406, the scene change indicators 1410, and the emotion tags 1414 provide constraints as to how to map the various video time slices 1400 to the music track 1402. In some instances, the constraints may compete against one another for mapping certain video time slices 1400. Weights 1408, 1412, and 1416 for no change indicator 1406, scene change indicator 1412, and emotion tag 1414, respectively, are one way to determine how the constraints should interact with one another.

For example, there is an emotion tag 1418 indicating comicality for a portion of the music track that constrains the video time slices 1420 and 1422 to be associated with a similar mood as indicated by reaction data. However, if it is the case that only video time slice 1420 is associated with comicality and not video time slice 1422, then the emotion tag 1418 may indicate that only video time slice 1420 should be mapped to that portion of the track and not video time slice 1422. However, there is also scene change indicator 1424 indicating that a change of scene should occur during the portion of the track tagged by emotion tag 1418. As a result, the constraint placed scene change indicator 1424 competes with that of emotion tag 1418. The mapping process reconciles the competing constraints by looking at the weights associated with the scene change indicator 1424 and the emotion tag 1418. In the embodiment shown, the scene change indicator 1424 is associated with a higher weight than the emotion tag 1418. As a result, the mapping process is shown to map video time slice 1422 to the scene change indicator 1424 even though video time slice 1422 is not associated with a mood of comicality. In other embodiments, the weighting process may be different. For example, in certain other embodiments, constraints placed by mood tags 1414 may be configured to win out against other constraints. However, this need not be the case in all embodiments.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the spectator reaction data and the creation of the event reel that is synchronized to a music track are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD- ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims

What is claimed is:

1. A method for creating an event reel for video content that is synchronized to music, the method including,
   receiving a video file for the video content;
   receiving spectator reaction data defined by reactions generated by spectators while viewing the video content, the spectator reaction data is indicative of segments of interest wherein the reactions of the spectator reaction data are timestamped;
   processing the spectator reaction data for identifying video time slices from the video content that correspond to the segments of interest of the video content having a threshold reaction intensity, each of the video time slices includes a plurality of video frames from the video content, wherein processing the spectator reaction data includes calculating reaction intensity for the spectator reaction data during intervals of time for the video file, the reaction intensity is identified by a summation of reactions during each of the respective intervals of time;
   processing a music track, received for creating the event reel, to identify markers for the music track that correspond to beats associated with the music track; and
   generating the event reel having a video component assembled for a sequence of the video time slices and an audio component defined at least partially by the music track, the generating the event reel includes synchronizing the video time slices to the markers for the music track, wherein the synchronizing causes scene changes between sequential video time slices to correspond in time with at least a portion of the beats associated with the music track.

2. The method of claim 1, wherein identifying the video time slices includes determining when the reaction intensity for the spectator reaction data exceeds a threshold.

3. The method of claim 1, wherein the synchronizing the video time slices to the markers for the music track includes editing the video time slices to cause the video time slices to fit to the markers.

4. The method of claim 3, wherein editing the video time slices to automatically fit to the markers includes one or more of adding video frames to a leading edge or the trailing edge of video time slices, removing video frames from the leading edge or the trailing edge video time slices, or speeding up or slowing down a playback speed of the video time slices.

5. The method of claim 1, wherein the reactions generated by spectators while viewing the video content includes inputs to cause one or more of emojis, emoticons, animojis, likes, thumbs-up, thumbs-down, thumbs-sideways, avatars, or symbols.

6. The method of claim 1, wherein the video component of the event reel is generated by assembling the video time slices into the sequence and joining sequential video time slices together to produce the video component.

7. The method of claim 1, wherein the processing the music track includes analyzing an audio waveform associated with the music track to identify the markers that correspond to the beats associated with the music track.

8. The method of claim 1, wherein the processing the music track further includes identifying indicators for changing scenes based on musical properties of the music track, and wherein the synchronizing the video time slices to the markers of the music track is configured to be in accordance with the indicators for changing scenes.

9. The method of claim 1, wherein the processing the music track further includes identifying indicators for not changing scenes based on music properties of the music track, and wherein the synchronizing the video time slices to the markers of the music track is configured to be in accordance with the indicators for not changing scenes.

10. The method of claim 1, wherein the video content includes one of a gaming session, or an e-sports broadcast, or a podcast, or a television show, or a movie, or a sports event broadcast, or an awards show, or a news show, or a video log (vlog), or user-generated content.

11. The method of claim 1,
    mixing an audio track associated with video content with the music track;
    wherein the audio component is defined a mix of the audio track and the music track.

12. The method of claim 1, wherein the music track is independent of audio associated with the video content, and said markers are automatically identified by detecting said beats exceeding an audio intensity threshold.

13. A server system, comprising:
    one or more processors; and
    a memory disposed in communication with the one or more processors and storing processor-executable instructions to:
    receive a video file of a video content;
    receive spectator reaction data related to reactions generated by spectators while viewing the video content, the spectator reaction data is indicative of segments of interest, wherein the reactions of the spectator reaction data are timestamped;
    process the spectator reaction data for identifying video time slices from the video content that correspond to the segments of interest of the video content having a threshold reaction intensity, each of the video time slices includes a plurality of video frames from the video content wherein processing the spectator reaction data includes calculating reaction intensity for the spectator reaction data during intervals of time for the video file, the reaction intensity is identified by a summation of reactions during each of the respective intervals of time;
    process a music track, received for creating an event reel, to identify markers for the music track that correspond to beats associated with the music track; and
    generate the event reel having a video component assembled for a sequence of the video time slices and an audio component defined at least partially by the music track, wherein generating the event reel includes synchronizing the video time slices to the markers for the music track, and wherein the synchronizing causes scene changes between sequential video time slices to correspond in time with at least a portion of the beats associated with the music track.

14. The system of claim 13, wherein the processor-executable instruction to identify the video time slices includes determining when the reaction intensity exceeds a threshold and when the reaction intensity falls below the threshold.

15. The system of claim 13, wherein the synchronizing the video time slices to the markers for the music track includes editing the video time slices to cause the video time slices to fit to the markers.

16. The system of claim 13, wherein the editing the video time slices to fit to the markers includes one or more of adding video frames to a leading edge or the trailing edge of video time slices, removing video frames from the leading edge or the trailing edge video time slices, or speeding up or slowing down a playback speed of the video time slices.

17. The system of claim 13, wherein the reactions generated by spectators while viewing the video content includes inputs to cause one or more of emojis, emoticons, animojis, likes, thumbs-up, thumbs-down, thumbs-sideways, avatars, or symbols.

18. The system of claim 13, wherein the video component of the event reel is generated by assembling the video time slices into the sequence and joining sequential video time slices together to produce the video component.

19. The system of claim 13, wherein the processor-executable instruction to process the music track includes analyzing an audio waveform associated with the music track to identify the markers that correspond to the beats associated with the music track.

20. The system of claim 13, wherein the video content includes one of a gaming session, or an e-sports broadcast, or a podcast, or a television show, or a movie, or a sports event broadcast, or an awards show, or a news show, or a video log (vlog), or user-generated content.

21. The system of claim 13, wherein the audio component is further defined by an audio track associated with the video content.

22. The system of claim 13, wherein the music track is independent of audio associated with the video content, and said markers are automatically identified by detecting said beats exceeding an audio intensity threshold.

23. A non-transitory computer-readable storage medium storing a computer program executable by a processor-based system, comprising:

program instructions for receiving a video file for a video content;
program instructions for receiving spectator reaction data related to reactions generated by spectators while viewing the video content, the spectator reaction data is indicative of segments of interest, wherein the reactions of the spectator reaction data are timestamped;
program instructions for processing the spectator reaction data for identifying video time slices from the video content that correspond to the segments of interest of the video content having a threshold reaction intensity, each of the video time slices includes a plurality of video frames from the video content, wherein processing the spectator reaction data includes calculating reaction intensity for the spectator reaction data during intervals of time for the video file, the reaction intensity is identified by a summation of reactions during each of the respective intervals of time;
program instructions for processing a music track, received for creating an event reel, to identify markers for the music track that correspond to musical signatures associated with the music track; and
program instructions for generating the event reel having a video component assembled for a sequence of the video time slices and an audio component defined by the music track, the generating the event reel includes synchronizing the video time slices to the markers for the music track, wherein the synchronizing causes scene changes between sequential video time slices to correspond in time with at least a portion of the musical signatures associated with the music track.

24. The non-transitory computer-readable storage medium of claim 23, wherein the synchronizing the video time slices to the markers for the music track includes editing the video time slices to fit to the markers, the editing the video time slices includes one or more of adding video frames to a leading edge or the trailing edge of video time slices, removing video frames from the leading edge or the trailing edge video time slices, or speeding up or slowing down a playback speed of the video time slices.

25. The non-transitory computer-readable storage medium of claim 24, wherein the video content includes a video game session for a video game, a TV-show, a movie, a sports event broadcast, an awards show, a news show, a video log (vlog), a user generated video, or a podcast.

* * * * *